(12) United States Patent
Urabe

(10) Patent No.: US 7,714,272 B2
(45) Date of Patent: May 11, 2010

(54) OPTICAL ABSOLUTE ROTARY ENCODER

(75) Inventor: Hideki Urabe, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 76 days.

(21) Appl. No.: 11/863,629

(22) Filed: Sep. 28, 2007

(65) Prior Publication Data

US 2009/0108188 A1   Apr. 30, 2009

(30) Foreign Application Priority Data

Sep. 28, 2006 (JP) ............................. 2006-265259
Nov. 22, 2006 (JP) ............................. 2006-315992

(51) Int. Cl.
*G01D 5/34* (2006.01)
(52) U.S. Cl. .............................. 250/231.13; 250/237 G; 356/616; 359/436; 359/438
(58) Field of Classification Search ................................
250/231.13–231.18, 237 R, 237 G; 356/616–619;
341/11, 13, 31; 359/436–442; 33/1 PT,
33/1 N
See application file for complete search history.

(56) References Cited

U.S. PATENT DOCUMENTS

| | | | | |
|---|---|---|---|---|
| 4,975,571 A | * | 12/1990 | McMurtry et al. | 250/231.16 |
| 5,534,693 A | * | 7/1996 | Kondo et al. | 250/237 G |
| 6,654,128 B2 | * | 11/2003 | Takayama et al. | 356/499 |
| 7,034,282 B2 | * | 4/2006 | Oka et al. | 250/231.13 |
| 2004/0113058 A1 | * | 6/2004 | Sonoki | 250/231.14 |
| 2007/0187582 A1 | * | 8/2007 | Chin et al. | 250/231.13 |

FOREIGN PATENT DOCUMENTS

| | | |
|---|---|---|
| JP | 6347288 | 12/1994 |
| JP | 6347292 | 12/1994 |
| JP | 2000146623 | 5/2000 |

\* cited by examiner

*Primary Examiner*—Thanh X Luu
*Assistant Examiner*—Francis M Legasse, Jr.
(74) *Attorney, Agent, or Firm*—Cermak Kenealy Vaidya & Nakajima LLP

(57) ABSTRACT

An optical absolute rotary encoder can have a simple and small structure, for determining the absolute values of rotational positions with high accuracy. The encoder can include an optical scale having an absolute pattern representing a code corresponding to a single absolute value using a transmitting area and/or an intercepting area. A light emitting unit can be arranged at one side with respect to the optical scale, and configured to project light on the optical scale. A light receiving unit can be arranged at the same side as the light emitting unit, can configured to receive light passing through the transmitting area of the optical scale. A light guide unit can be provided and configured to guide the light from the light emitting unit to the light receiving unit. The optical scale and the light emitting unit can rotate relative to each other about an axis of rotation, and the light receiving unit can be disposed on the axis of rotation.

20 Claims, 17 Drawing Sheets

Fig. 7

| Rotational position | Absolute value of rotational position MSB ← → LSB | |
|---|---|---|
| | Pure binary code | Gray code |
| 0 | 00000 | 00000 |
| 1 | 00001 | 00001 |
| 2 | 00010 | 00011 |
| 3 | 00011 | 00010 |
| 4 | 00100 | 00110 |
| 5 | 00101 | 00111 |
| 6 | 00110 | 00101 |
| 7 | 00111 | 00100 |
| 8 | 01000 | 01100 |
| 9 | 01001 | 01101 |
| 10 | 01010 | 01111 |
| 11 | 01011 | 01110 |
| 12 | 01100 | 01010 |
| 13 | 01101 | 01011 |
| 14 | 01110 | 01001 |
| 15 | 01111 | 01000 |
| 16 | 10000 | 11000 |
| 17 | 10001 | 11001 |
| 18 | 10010 | 11011 |
| 19 | 10011 | 11010 |
| 20 | 10100 | 11110 |
| 21 | 10101 | 11111 |
| 22 | 10110 | 11101 |
| 23 | 10111 | 11100 |
| 24 | 11000 | 10100 |
| 25 | 11001 | 10101 |
| 26 | 11010 | 10111 |
| 27 | 11011 | 10110 |
| 28 | 11100 | 10010 |
| 29 | 11101 | 10011 |
| 30 | 11110 | 10001 |
| 31 | 11111 | 10000 |

| Rotational position | Absolute value of rotational position | | | | |
|---|---|---|---|---|---|
| | Light emitting device 2a | Light emitting device 2b | Light emitting device 2c | Light emitting device 2d | Light emitting device 2e |
| 0 | 0 | 1 | 1 | 1 | 0 |
| 1 | 0 | 1 | 1 | 0 | 0 |
| 2 | 0 | 1 | 0 | 0 | 0 |
| 3 | 0 | 1 | 0 | 0 | 1 |
| 4 | 0 | 1 | 0 | 1 | 1 |
| 5 | 0 | 1 | 1 | 1 | 1 |
| 6 | 0 | 0 | 1 | 1 | 1 |
| 7 | 0 | 0 | 1 | 1 | 0 |
| 8 | 0 | 0 | 1 | 0 | 0 |
| 9 | 1 | 0 | 1 | 0 | 0 |
| 10 | 1 | 0 | 1 | 0 | 1 |
| 11 | 1 | 0 | 1 | 1 | 1 |
| 12 | 1 | 0 | 0 | 1 | 1 |
| 13 | 0 | 0 | 0 | 1 | 1 |
| 14 | 0 | 0 | 0 | 1 | 0 |
| 15 | 0 | 1 | 0 | 1 | 0 |
| ⋮ | ⋮ | ⋮ | ⋮ | ⋮ | ⋮ |
| 27 | 1 | 0 | 0 | 1 | 0 |
| 28 | 1 | 0 | 1 | 1 | 0 |
| 29 | 1 | 1 | 1 | 1 | 0 |

OPTICAL ABSOLUTE ROTARY ENCODER

This application claims the priority benefit under 35 U.S.C. §119 of Japanese Patent Application No. 2006-265259 filed on Sep. 28, 2006 and Japanese Patent Application No. 2006-315992 filed on Nov. 22, 2006, which are hereby incorporated in their entirety by reference.

BACKGROUND

1. Technical Field

The disclosed subject matter relates to an absolute rotary encoder, and in particular, to an optical absolute rotary encoder for detecting a rotational position as an absolute position.

2. Description of the Related Art

Known optical absolute rotary encoders disclosed in, for example, Japanese Patent Application Laid-Open No. Hei 06-347292 can detect a rotational position as an absolute value based on transmitted light from a light emitting device. One exemplary structure of a rotary encoder is shown in FIG. 1. The rotary encoder includes a light emitting device 102, a drive circuit 101 for driving the light emitting device 102, a collimator lens 103 for collimating light emitted from the light emitting device 102, and a rotary disk 104. The rotary disk 104 has a recording surface including a plurality of tracks for allowing rotational position information to be recorded thereon as slits that represent a code pattern such as a pure binary code, a gray code, or other codes.

FIG. 2 shows one exemplary construction of the rotary disk 104. The rotary disk 104 has an optical recording surface including five tracks 104a through 104e. The outermost track 104a is used for forming slits representing the least significant bit (LSB) signal of rotational position information. The inner tracks are used for forming slits representing upper bit signals, and the innermost track 104e is used for forming slits representing the most significant bit (MSB) signal.

The rotary encoder further includes a rotary shaft 105, light receiving devices (being photodetectors) 106a through 106e, and a decoder circuit 107. The rotary shaft 105 is coupled to the rotational center of the rotary disk 104 to transmit externally provided rotational force to the rotary disk 104. The light receiving devices 106a through 106e receive the transmitted light through slits of the respective tracks 104a through 104e of the rotary disk 104 for photoelectric conversion. The decoder circuit 107 receives the output signals from the light receiving devices 106a through 106e in order to determine the absolute value of a rotational position.

In this rotary encoder, the light emitted from the light emitting device 102 is collimated by the collimator lens 103 such that it is linearly projected on the rotary disk 104 in the radial direction. Then, the light beams passing through the slits of the respective tracks 104a through 104e are received by the respective light receiving devices 106a through 106e for photoelectric conversion. The decoder circuit 107 can provide the absolute value of a rotational position by determining whether the transmitted light exists or not based on the output signals from the light receiving devices 106a through 106e.

In the conventional optical absolute rotary encoder as described above, the light emitting device 102 and the light receiving devices 106a through 106e must be arranged at the respective sides of the rotary disk 104. Therefore, the light emitting device and the associated parts such as optical parts and electrical circuits (including a driving circuit) are disposed at one side of the rotary disk 104, and the light receiving devices and the associated parts such as optical parts and electrical circuits (including the decoder circuits and a driving circuit) are disposed at the other side of the rotary disk 104. This may complicate the structure for electrically connecting the parts with each other and for optical arrangement, resulting in difficulty in miniaturizing the entire rotary encoder.

In the meantime, the absolute pattern recorded on the rotary disk 104 of the above described rotary encoder is of a multi-track type for obtaining n-bit value from n tracks (the shown example is the case where n=5). In contrast to this, another type of optical absolute rotary encoder has been proposed which uses a single-track type absolute pattern for providing n-bit value by means of a single track (see, for example, Japanese Patent Application Laid-Open No. Hei 06-347288 (Japanese Patent No. 3093924), and Japanese Patent Application Laid-Open No. 2000-146623). This single-track type absolute pattern employs M-series codes, and the slits are recorded in accordance with the M-series code arrangement. In this code arrangement, the values represented by consecutive n-bit codes on a single track are different at every position. Accordingly, the correspondence between the rotational position and the value represented by the absolute pattern is stored in advance, and an absolute value of a rotational position can be determined based on the light pattern transmitted through the slits with reference to the stored correspondence.

The M-series codes can be generated using a shift register code generator and a primitive polynomial. For example, when n=5, the primitive polynomial can be represented by the following equation (1):

$$f(x)=x^5+x^3+1 \tag{1}$$

In this instance, the shift register code generator can generate M-series code pattern by allowing values from registers corresponding to the positions determined in accordance with the equation (1) to pass through an EXCLUSIVE-OR gate. The M-series code pattern thus generated is as follows:

$$\left.\begin{array}{c} 00001 \\ 00010 \\ 00100 \\ 01001 \\ \ldots \\ 10101 \end{array}\right\} \text{M-series (5 bits): } 0000100101100111110001101110101$$

If 5 consecutive bits are picked up, the 5-bit code can be uniquely determined in accordance with the position at which the consecutive 5 bits are detected. In this manner, the determined 5-bit code can provide the corresponding absolute position.

FIG. 3 shows another rotary disk 111 having a single track 111a for recording M-series absolute pattern when n=5. The optical absolute rotary encoder including this rotary disk 111 has a single light emitting device arranged at one side of the rotary disk 111 to project light along the circumference of the rotary disk 111. In this rotary encoder, the light transmitted through slits of the track 111a of the rotary disk 111 is received by five light receiving devices 112a through 112e arranged at the other side of the rotary disk 111 for photoelectric conversion. Then, a decoder circuit can detect whether the transmitted light exists or not based on the delivered signals, thereby determining the corresponding absolute value of a rotational position. In FIG. 3, dotted lines show the respective positions of the five light receiving devices 112a through 112e. This type of rotary encoder can determine the absolute value of a rotational position by means of a single track, and therefore it is easy to miniaturize the rotary disk 111 in comparison with the multi-track type device.

The optical absolute rotary encoder in accordance with the above-described system uses an M-series code pattern wherein the values represented by consecutive n bits on a single track are different from each other at every position. In this instance, a changed bit number of code pattern is complicated at a transition point of adjacent absolute position information. In other words, a plurality of bits change at the transition point and the timing of change may vary. In some cases, different code patterns which should not be derived from the corresponding position may appear. This may result in erroneously reading absolute position information during rotation. In order to more definitely determine such intermediate rotational positions, it is required to provide a certain mechanism for preventing reading error, such as a mechanical device or an auxiliary track.

In addition to this, in the conventional optical absolute rotary encoder using a single track system as described above, the light emitting device and the light receiving devices must be arranged at the respective sides of the rotary disk. This may complicate the structure for electrically connecting the parts with each other and for optical arrangement, resulting in difficulty in miniaturizing the entire rotary encoder.

SUMMARY

According to an aspect of the presently disclosed subject matter an optical absolute rotary encoder can include a small and simple structure and can determine the absolute value of a rotational position with high accuracy.

According to another aspect of the presently disclosed subject matter a rotary encoder can include: an optical scale having an absolute pattern representing a code corresponding to a single absolute value using a combination of a transmitting area and an intercepting area; a light emitting unit arranged at one side with respect to the optical scale, for projecting light on the optical scale; a light receiving unit arranged at the same side as the light emitting unit with respect to the optical scale, for receiving light passing through the transmitting area of the optical scale; and a light guide unit for guiding the light projected from the light emitting unit and passing through the transmitting area to the light receiving unit. In this rotary encoder, the optical scale and the light emitting unit can be configured so that they can rotate relative to each other, and the light receiving unit can be disposed on a rotation center line (being an axis of rotation) of the relative rotation of both the optical scale and light emitting unit.

In accordance with the above-described optical absolute rotary encoder, a code can be represented by a combination of consecutive transmitting area(s) and/or intercepting area(s) of the optical scale that face the light emitting unit. In this instance, the code corresponds to the absolute value of the rotational position of the optical scale with respect to the light emitting unit, for example. Accordingly, the absolute value of the rotational position can be determined based on the light passing through the transmitting area(s) of the optical scale. Furthermore, the light emitting unit and the light receiving unit can be arranged at the same side with respect to the optical scale. This can facilitate the mounting of the light emitting unit and the light receiving unit on the same circuit board together with the associated driving circuits and other circuits. In accordance with this configuration, the light projected from the light emitting unit and passing through the transmitting area of the optical scale can be effectively guided to the light receiving unit by means of the light guide unit. Thus, a miniaturized and simple-structured optical absolute rotary encoder which determines the absolute value of a rotational position with improved accuracy can be realized.

According to another aspect of the presently disclosed subject matter an optical absolute rotary encoder can include: an optical scale having an absolute pattern representing a code corresponding to a single absolute value using a combination of a transmitting area and an intercepting area formed on a single track; a light emitting unit for projecting light on the optical scale; and a light receiving unit for receiving light projected from the light emitting unit and passing through the transmitting area of the optical scale. In this rotary encoder, the optical scale and the light emitting unit can be configured so that they rotate relative to each other, and the light emitting unit can be composed of a plurality of light emitting devices which are arranged at predetermined intervals along a circumference of rotation.

In accordance with the optical absolute rotary encoder described immediately above, a code can be represented by a combination of consecutive transmitting area(s) and/or intercepting area(s) of the optical scale that face the light emitting unit. In this instance, the code corresponds to the absolute value of the rotational position of the optical scale with respect to the light emitting unit, for example. Accordingly, the absolute value of the rotational position can be determined based on the light passing through the transmitting area(s) of the optical scale.

In this instance, the plurality of light emitting devices of the light emitting unit can be disposed at predetermined intervals along the circumference of the rotation, for example, at equal intervals obtained by equally dividing the circumference (being the single track). Accordingly, when a predetermined code pattern is used as the absolute pattern, the transmitting area and the intercepting area of the optical scale can be formed so that the difference between codes representing adjacent rotational positions is one bit. Namely, the optical scale can be formed such that the bit difference between one step before and after the rotation can always be one bit. This configuration can prevent the occurrence of reading errors at any transition points of rotational positions, thereby determining the absolute value of a rotational position by means of a single track with high accuracy.

Accordingly, a miniaturized and simple-structured optical absolute rotary encoder can be realized to determine the absolute value of a rotational position with improved accuracy.

In the above-described optical absolute rotary encoder, the light emitting unit can be arranged at one side with respect to the optical scale. The light receiving unit can be arranged at the same side as the light emitting unit with respect to the optical scale, and is disposed on a rotation center line (being an axis of rotation) of the relative rotation. Furthermore, the rotary encoder can also include a light guide unit for guiding the light projected from the light emitting unit and which passes through the transmitting area to the light receiving unit. In this instance, the light emitting unit and the light receiving unit are arranged at the same side with respect to the optical scale. This can facilitate the mounting of the light emitting unit and the light receiving unit on the same circuit board together with the associated driving circuits and other circuits. In accordance with this configuration, the light projected from the light emitting unit which passes through the transmitting area of the optical scale can be effectively guided to the light receiving unit by means of the light guide unit. This can miniaturize and simplify the structure of the optical absolute rotary encoder.

Yet another aspect of the presently disclosed subject matter is directed to an optical absolute rotary encoder that can include: an optical scale having an absolute pattern representing a code corresponding to a single absolute value using a combination of a transmitting area and an intercepting area formed on a single track; a light emitting unit arranged at one side with respect to the optical scale, for projecting light on the optical scale; a light receiving unit arranged at the same side as the light emitting unit with respect to the optical scale, for receiving light passing through the transmitting area of the optical scale; and a light guide unit for guiding the light projected from the light emitting unit and which passes through the transmitting area to the light receiving unit. In this rotary encoder, the optical scale and the light emitting unit can be configured so that they rotate relative to each other, the light emitting unit can be disposed along the circumference of rotation, and the light receiving unit can be disposed on a rotation center line (being an axis of rotation) of the relative rotation of both.

As in the first aspect, a code can be represented by a combination of consecutive transmitting area(s) and/or intercepting area(s) of the optical scale that face the light emitting unit. In this instance, the code corresponds to the absolute value of the rotational position of the optical scale with respect to the light emitting unit, for example. Accordingly, the absolute value of the rotational position can be determined based on the light passing through the transmitting area(s) of the optical scale.

Furthermore, the light emitting unit and the light receiving unit can be arranged at the same side with respect to the optical scale. This can facilitate the mounting of the light emitting unit and the light receiving unit on the same circuit board together with the associated driving circuits and other circuits. In accordance with this configuration, light can be projected from the light emitting unit that is arranged along the circumference of the rotation and can pass through the transmitting area of the optical scale. That light can be effectively guided to the light receiving unit by means of the light guide unit. Accordingly, the absolute value of a rotational position can be easily determined by means of the single track.

Therefore, a miniaturized and simple-structured optical absolute rotary encoder can be realized and can determine the absolute value of a rotational position with improved accuracy.

Furthermore, in the optical absolute rotary encoder described above, the difference between codes representing adjacent rotational positions can be one bit in the absolute pattern included in the optical scale. Namely, the optical scale can be formed such that the difference between codes corresponding to adjacent absolute values, or the change between one step before and after the rotation, can always be one bit. This configuration can prevent the occurrence of reading errors at any transition points of rotational positions. In this instance, there is no need to provide any mechanism for preventing reading error, and the absolute value of a rotational position can be determined with high accuracy by the use of the single track.

The light emitting unit may be composed of a light emitting device, such as a light emitting diode, a laser diode, or the like. The light receiving unit may be composed of a light receiving device such as a photodiode or the like.

The optical scale may be in the shape of a disk. Therefore it can be disposed such that it can rotate around the rotary shaft of the disk (rotary disk). The light guide unit may be a body of revolution (being a rotary light guide disk), of which rotary shaft may be the same as that of the optical scale.

In the above-described optical absolute rotary encoder(s), the light guide unit may have a first reflecting surface which is configured to totally reflect incident light and a second reflecting surface which is configured to reflect light reflected by the first reflecting surface so as to converge the light toward the light receiving unit.

In this instance, the light emitted from the light emitting unit can be incident on the light guide unit and is totally reflected by the first reflecting surface. Then, the reflected light can further be reflected by the second reflecting surface and converged to the light receiving unit. This configuration can prevent light loss and can guide the incident light to the light receiving unit efficiently.

Examples of the material for the light guide unit can include materials having a refractive index greater than that of air, such as acrylic resins. Use of this type of material can achieve total reflection when the incident angle is greater than a prescribed critical angle.

In an optical absolute rotary encoder made in accordance with principles of the presently disclosed subject matter, the first reflecting surface can be configured to form an angle of 45° with respect to the direction of incident light.

In this instance, the light emitted from the light emitting unit and which is incident on the light guide unit can be totally reflected by the first reflecting surface to a direction by 90° with respect to the direction of incident light. Therefore, the incident light can be efficiently guided toward the axis of rotation of the optical scale.

In another aspect of an optical absolute rotary encoder made in accordance with principles of the presently disclosed subject matter, the second reflecting surface can be configured to have a parabolic shape having its focus at the position at or in the vicinity of the light receiving unit.

In this instance, since the second reflecting surface can be formed to have a parabolic surface in order to converge the light incident on the second reflecting surface toward its focus, the light totally reflected by the first reflecting surface can be effectively guided to the light receiving unit.

In addition, the light guide unit can have an outgoing light surface for allowing light reflected by the second reflecting surface to go out toward the light receiving unit. In this instance, the outgoing light surface may be a spherical shape, at the center of which the light receiving unit is positioned. Since light can be incident on the second reflecting surface and reflected by the same to be converged to the light receiving unit, and the outgoing light surface can be a spherical shape with its center being the position of the light receiving unit, the light reflected by the second reflecting surface may be incident on the outgoing light surface by an angle of 90°. Accordingly, the light can go out from the outgoing light surface without being affected by any optical effect of the outgoing light surface such as refraction, reflection, and other optical effects. This can achieve effective convergence of the incident light to the light receiving unit.

In an optical absolute rotary encoder made in accordance with principles of the presently disclosed subject matter, the light guide unit may have a parabolic incident surface in order to collimate the incident light emitted from the light emitting unit.

In this instance, since the light incident surface of the light guide unit can collimate the incident light, there is no need to have any additional optical parts such as a collimator lens for collimating output light when the light emitting unit employs LEDs or the like which emit light in the circumferential direction. Furthermore, the light guide and encoder can have a simple configuration and the incident light can be effectively and properly guided to the light receiving unit.

BRIEF DESCRIPTION OF THE DRAWINGS

These and other characteristics, features, and advantages of the presently disclosed subject matter will become clear from the following description with reference to the accompanying drawings, wherein:

FIG. 7 is a table showing absolute pattern codes of the respective optical scales of FIG. 5 and FIG. 6;

FIGS. 9A and 9B are perspective views showing the rotary light guide disk of the optical absolute rotary encoder of FIG. 4 from below and above, respectively;

DETAILED DESCRIPTION OF EXEMPLARY EMBODIMENTS

A description will now be given of exemplary embodiments that are constructed in accordance with principles of the presently disclosed subject matter with reference to the accompanying drawings. The presently disclosed subject matter, however, is not limited to these exemplary embodiments.

Figure 1:
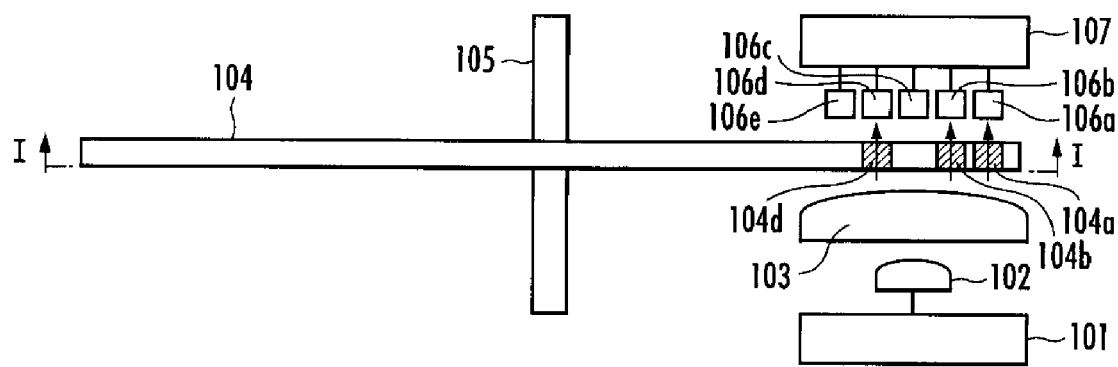
FIG. 1 is a diagram illustrating the configuration of a conventional optical absolute rotary encoder.
Figure 2:
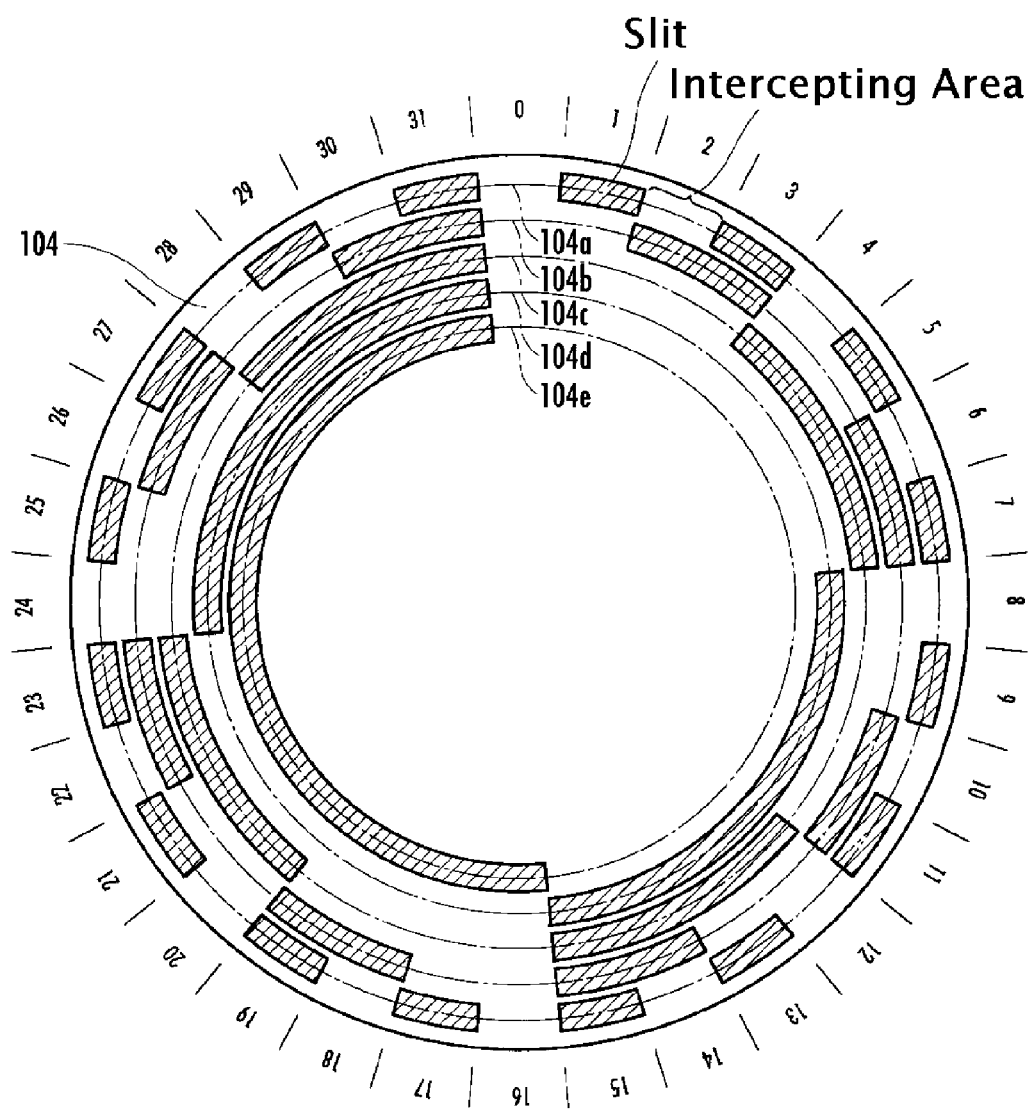
FIG. 2 is a diagram showing the face of the optical scale (being a rotary disk) of the optical absolute rotary encoder of FIG. 1, taken along the line I-I of FIG. 1.
Figure 3:
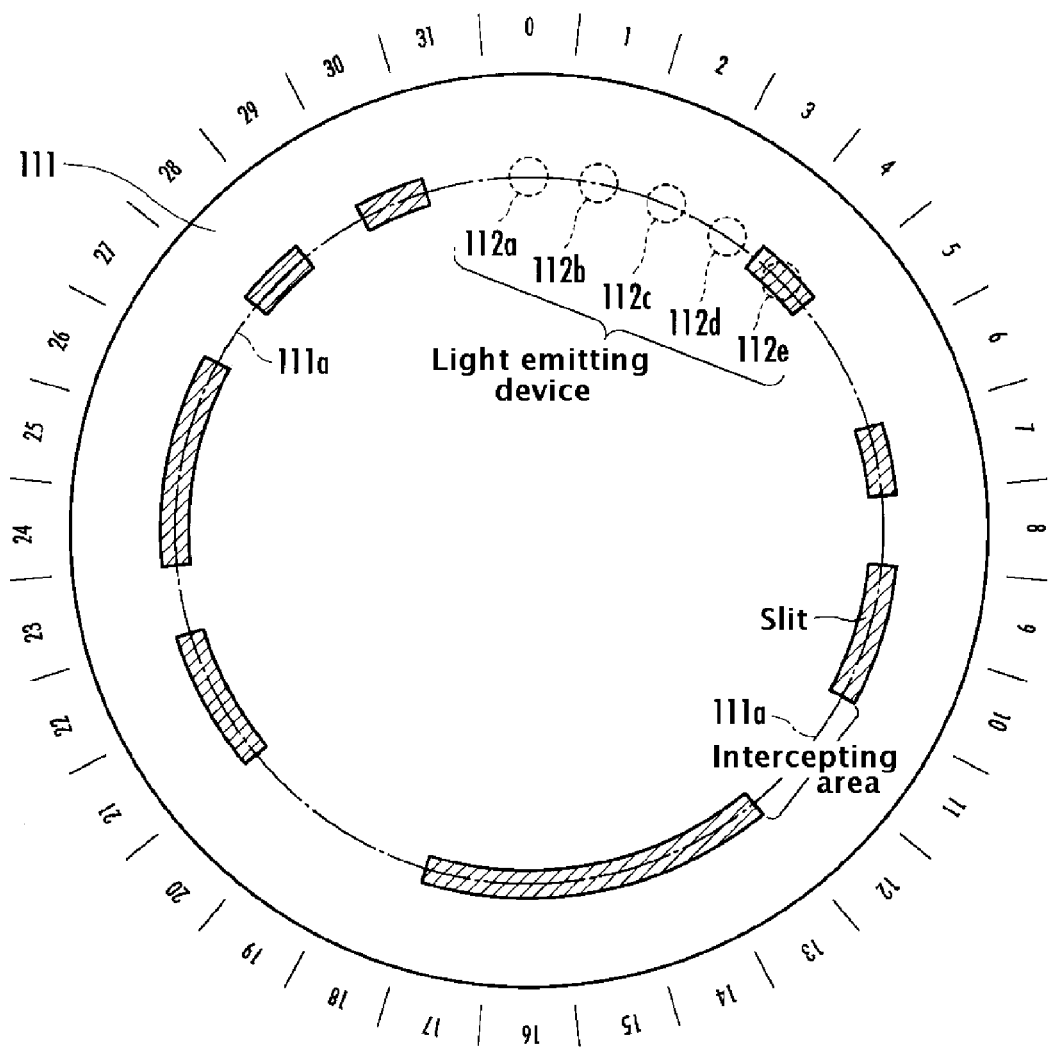
FIG. 3 is a diagram showing the face of another optical scale (being a rotary disk) and the arrangement of light receiving devices of another conventional optical absolute rotary encoder.
Figure 4:
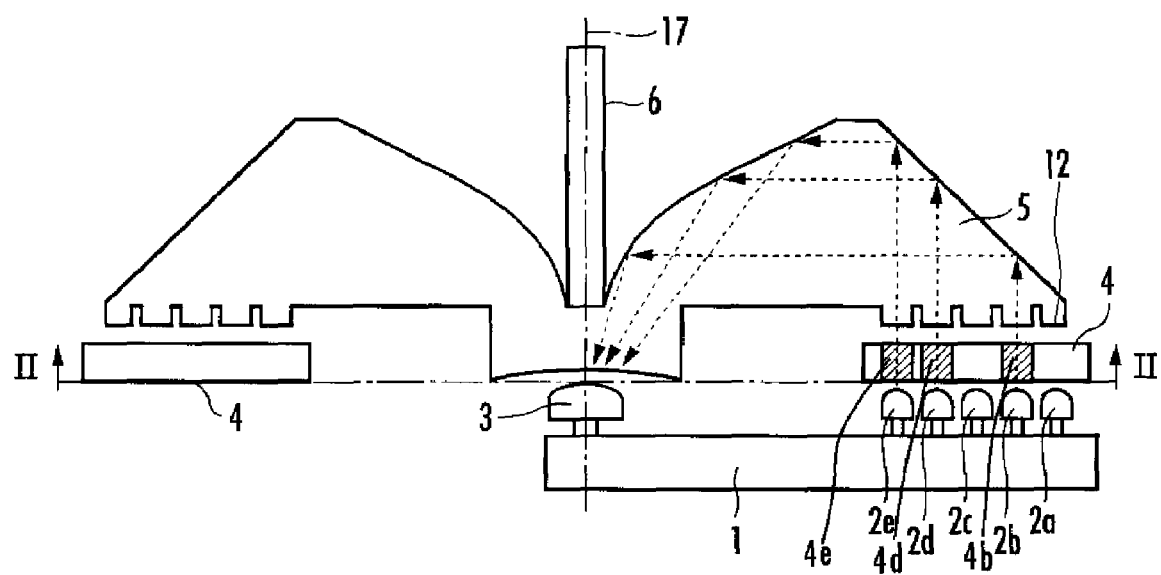
FIG. 4 is a cross-sectional side view illustrating the configuration of an optical absolute rotary encoder made in accordance with principles of the presently disclosed subject matter.

FIG. 4 shows a cross-sectional view of an optical absolute rotary encoder made in accordance with principles of the presently disclosed subject matter. The optical absolute rotary encoder can include a plurality of light emitting devices 2a to 2e (five light emitting devices in this exemplary embodiment), a single light receiving device 3, a rotary disk 4, and a rotary light guide disk 5. The plurality of light emitting devices 2a to 2e can project light onto the rotary disk 4. Here, the rotary disk 4 is an optical scale having an absolute pattern. The rotary light guide disk 5 serving as a light guide unit can guide the light passing through the rotary disk 4 to the light receiving device 3. The light receiving device 3 can receive light that has been emitted from the light emitting devices 2a to 2e, has passed through the rotary disk 4, and has been transmitted through the rotary light guide disk 5. It should be noted that the five light emitting devices 2a to 2e and the single light receiving device 3 correspond to the light emitting unit and the light receiving unit, respectively.

Figure 5:
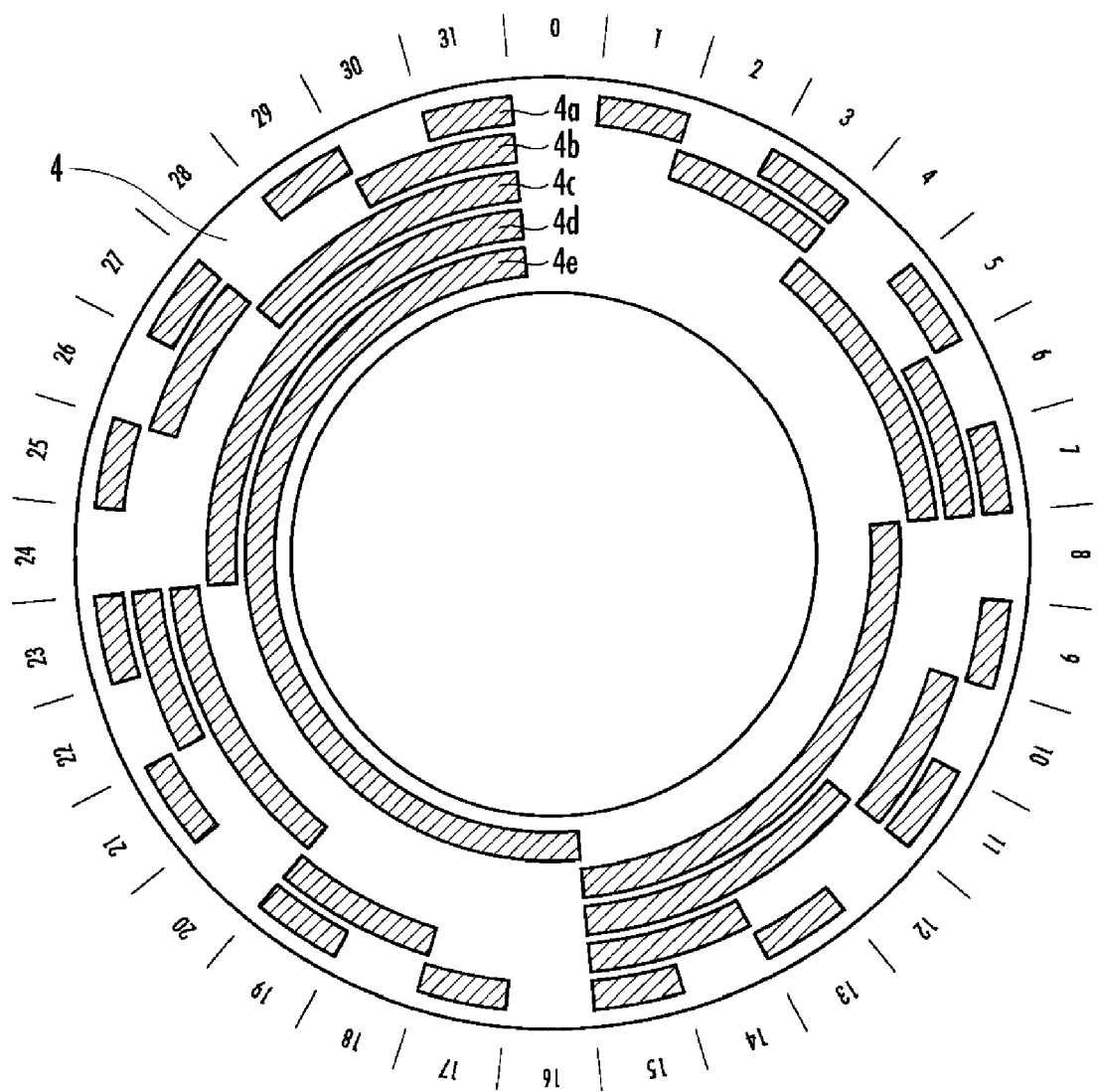
FIG. 5 is a top view showing the face of the optical scale (being a rotary disk) of the optical absolute rotary encoder of FIG. 4, taken along the line II-II of FIG. 4.

FIG. 5 is a diagram showing the face of the rotary disk 4 of FIG. 4, taken along the line II-II. The rotary disk 4 can take a disk shape having a through hole formed at the center thereof and can have a surface which serves as an optical recording surface. The optical recording surface is composed of a plurality of concentric tracks 4a to 4e (in this embodiment, being five tracks) which each have a circumferential strip part with a predetermined width for signal recording. Each of the tracks 4a to 4e has slits (being transmitting areas) for allowing light to pass therethrough. Areas other than slits are configured to intercept the light (being intercepting areas). In FIGS. 4 and 5, the slits (transmitting areas) are shaded. In this manner, signals can be recorded on the rotary disk 4.

The combination of slits formed in the five tracks 4a to 4e of the rotary disk 4 can constitute the absolute pattern (being the absolute value code pattern). The absolute pattern includes a code pattern wherein a signal which shows a single absolute value and has a prescribed bit number (in the present exemplary embodiment, 5-bit signal) is represented by a code such as a pure binary code, a gray code, or other codes. For example, a slit being a transmitting area shall stand for a value of "1" and an intercepting area shall stand for a value of "0." A combination of consecutive slits and/or intercepting areas formed in the five tracks 4a to 4e in the radial direction of the rotary disk 4 can represent a 5-bit signal which corresponds to a single absolute value of a rotational position. For example, the outermost track 4a can be used for forming slits representing the least significant bit (LSB) signal of rotational position information. The inner tracks can be used for forming slits representing upper bit signals, and the innermost track 4e can be used for forming slits representing the most significant bit (MSB) signal.

In the present exemplary embodiment, the five light emitting devices 2a to 2e (for example, five LEDs) and the single light receiving device 3 (for example, a single photodiode) are mounted on the same circuit substrate 1. That circuit substrate 1 is disposed at one side of the rotary disk 4. In this exemplary embodiment, the five light emitting devices 2a to 2e are arranged in line in the radial direction of the rotary disk 4 while they face the corresponding tracks 4a to 4e. The light receiving device 3 is disposed on the axis of rotation 17 of the rotary disk 4.

It should be important to note that the optical absolute rotary encoder in accordance with the presently disclosed subject matter can include a drive circuit for driving the light emitting devices 2a to 2e, a drive circuit for driving the light receiving device 3, a decoder circuit for determining an absolute value of a rotational position based on the output signal from the light receiving device 3, and other circuits (which are not shown in the drawings). Those electric circuits can also be mounted on the same circuit substrate 1.

The rotary light guide disk 5 (being a light guide unit) can be a body of revolution that includes a rotary shaft which can be the same as (or coincide with) the axis of rotation 17 of the rotary disk 4. A rotary shaft 6 is coupled to the center area of the rotary light guide disk 5 for transmitting an external rotational force to the rotary light guide disk 5. Namely, the rotary light guide disk 5 can rotate with the rotary shaft 6 serving as an axis of rotation. In this case, the rotary disk 4 may be directly formed in the incident surface 12 of the rotary light guide disk 5 or may be separately formed to be coupled to the rotary light guide disk 5 such that the rotary disk 4 and the rotary light guide disk 5 can rotate together. In this instance, the circuit substrate 1 is fixed. Accordingly, the rotary disk 4 and the light emitting devices 2a to 2e are disposed so that they rotate relative to each other. The axis of rotation 17 can also serve as an axis of rotation of the relative rotary movement between the rotary disk 4 and the light emitting devices 2a to 2e. When the rotary disk 4 rotates, a code corresponding to the absolute value of the rotational position of the rotary disk 4 can be represented by a combination of consecutive slits and/or intercepting areas formed in the tracks 4a to 4e in the radial direction of the rotary disk 4 just above the light emitting devices 2a to 2e.

Figure 6:
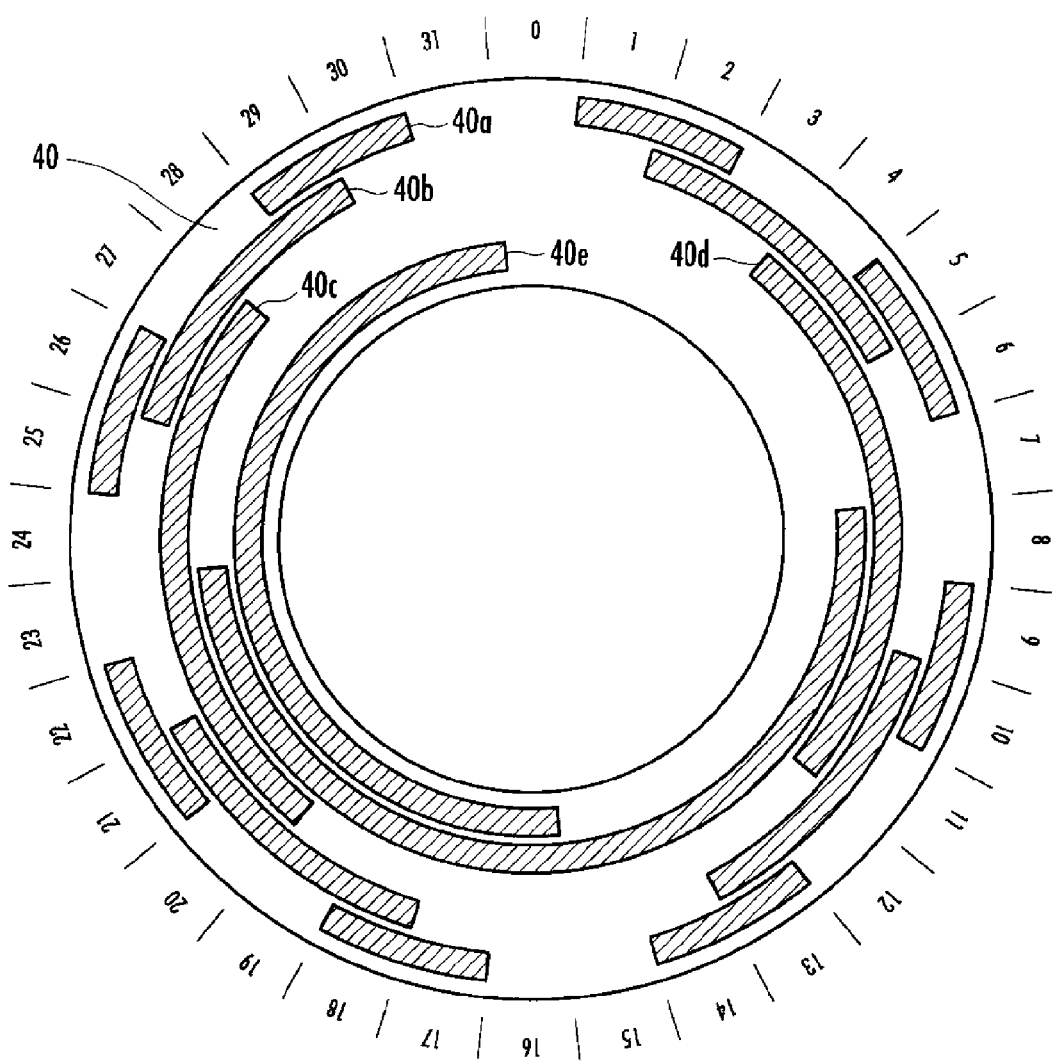
FIG. 6 is a top view showing another embodiment of a face of an optical scale (being a rotary disk) for use in an optical absolute rotary encoder made in accordance with principles of the presently disclosed subject matter.

The absolute pattern of the rotational position derived from the rotary disk 4 having the slits as shown in FIG. 5 may include a pure binary code. Alternatively, in place of the rotary disk 4 as shown in FIG. 5, another rotary disk 40 as shown in FIG. 6 may be employed which include gray codes constituting the absolute pattern of the rotational positions. The rotary disk 40 has an optical recording face composed of a plurality of concentric tracks 40a to 40e as in the rotary disk 4 shown in FIG. 5. The combinations of slits formed in the five tracks 40a to 40e can constitute the absolute pattern of rotational positions as gray codes. Each of the two types of rotary disks 4 and 40 can provide signals representing the absolute pattern of rotational positions (pure binary codes and gray codes), and such signals are shown in the table of FIG. 7 where the slit being a transmitting area shall stand for a value of "1" and the intercepting area shall stand for a value of "0." Using these signals, absolute values of rotational positions which are given by dividing the overall scale by 32 can be determined.

The rotary light guide disk 5 has an optical path for guiding incident light, having passed through the slits formed in the respective tracks 4a to 4e of the rotary disk 4, to the light receiving device 3. In the shown cross-sectional view in FIG. 4, slits are formed in the respective tracks 4b, 4d and 4e just above the light emitting devices 2b, 2d and 2e. As shown by the dotted arrows, the light having passed through each of the slits is incident on the rotary light guide disk 5 and guided toward the light receiving device 3.

Figure 8:
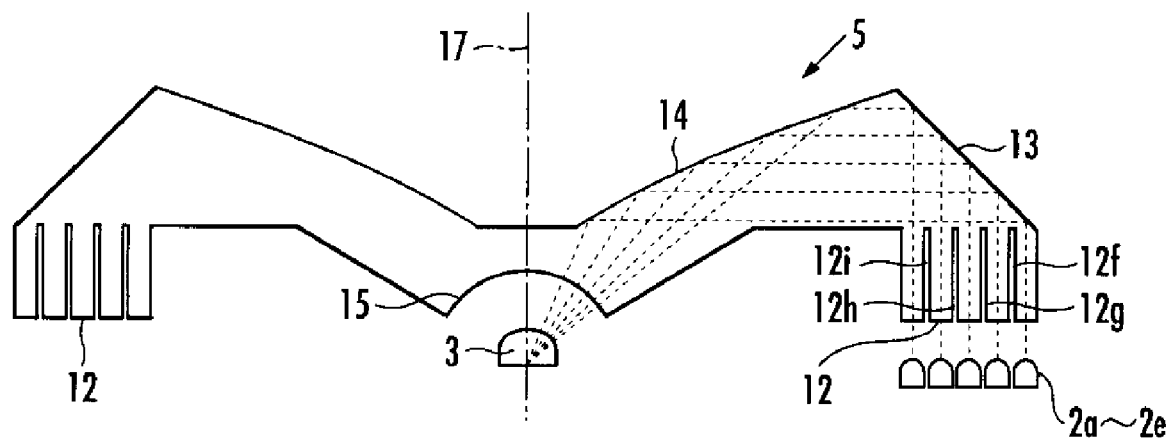
FIG. 8 is a cross-sectional detailed side view illustrating the light guide unit (being a rotary light guide disk) of the optical absolute rotary encoder of FIG. 4.

FIG. 8 is a cross-sectional view showing the details of a light guide structure of the rotary light guide disk 5. FIG. 8 shows dotted lines representing respective light paths in the case where the light beams from the respective five light emitting devices 2a to 2e are incident on the rotary light guide disk 5 to be guided to the light receiving device 3. Note that the rotary disk 4 or 40 is not shown in the figures for simplifying the drawing. The rotary light guide disk 5 includes a light incident surface 12, a first reflecting surface 13, a second reflecting surface 14 and an outgoing light surface 15. The light beams emitted from the light emitting devices 2a to 2e are incident on the light incident surface 12. The incident light can be reflected by the first reflecting surface 13. The light reflected by the first reflecting surface 13 can be further reflected by the second reflecting surface 14 so as to be converged toward the light receiving device 3. The light reflected by the second reflecting surface 14 can exit the light guide disk 5 via the outgoing light surface 15.

Figure 9A:
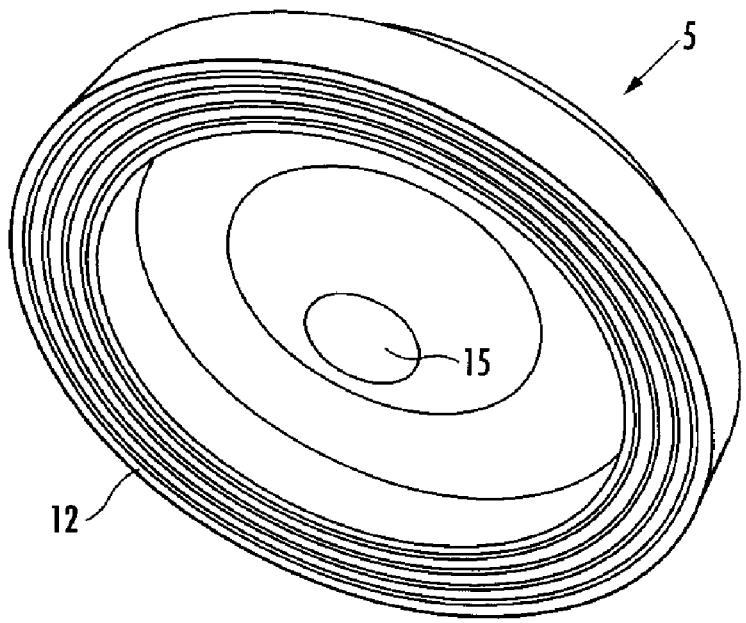
Figure 9A:
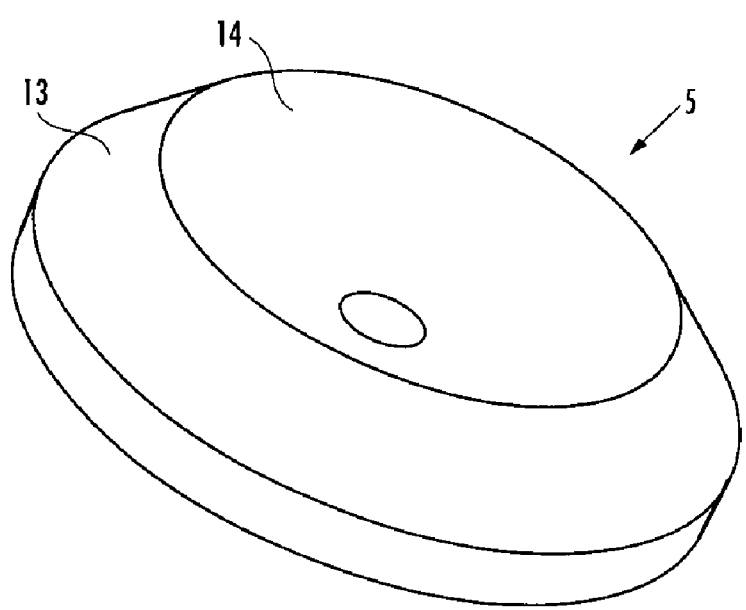

The rotary light guide disk 5 can have a rotational symmetric structure around the axis of rotation 17. FIG. 9A is a perspective view of the rotary light guide disk 5 when seen from below, and FIG. 9B is a perspective view thereof when seen from above. As can be understood from FIGS. 9A and 9B, the light incident surface 12, the first reflecting surface 13, the second reflecting surface 14, and the outgoing light surface 15 can each be a rotationally symmetric surface.

As shown in FIG. 4, the light incident surface 12 of the rotary light guide disk 5 is opposed to the five light emitting devices 2a to 2e with the five tracks 4a to 4e of the rotary disk 4 interposed therebetween. The light beams from the light emitting devices 2a to 2e passing through the slits of the tracks 4a to 4e are incident on the light incident surface 12. In this instance, as shown in FIG. 8, grooves 12f to 12i are formed in the light incident surface 12 in order to effectively guide, to the first reflecting surface 13, the light emitted from the respective light emitting devices 2a to 2e, the light having passed through the slits formed in the respective tracks 4a to 4e, and incident on the rotary light guide disk 5.

The first reflecting surface 13 is formed to have a predetermined angle with respect to the direction of incident light in order to totally reflect the incident light. For example, the first reflecting surface 13 may be formed by an angle of 45° with respect to the direction of incident light. In this instance, the incident light can be totally reflected by the first reflecting surface 13 to a direction that is 90° with respect to the direction of incident light, namely, toward the rotary shaft 6.

Figure 10:
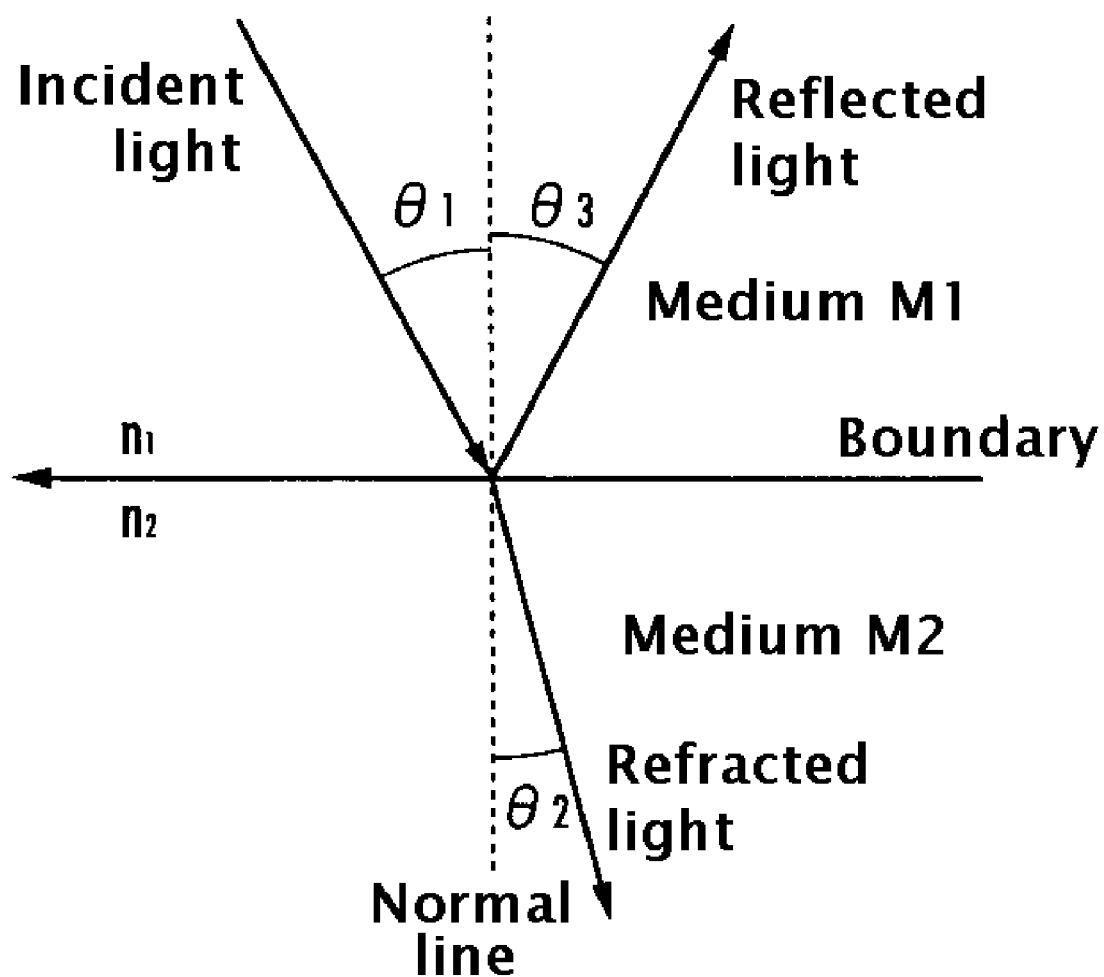
FIG. 10 is a diagram illustrating the operation of the incident light and reflected light and transmitting light in the rotary encoder of FIG. 4.

As shown in FIG. 10, when light passing through a medium M1 having a refractive index of $n_1$ enters a medium M2 having a refractive index of $n_2$, the light entering the medium M2 is refracted by a refractive angle of $\theta_2$ with respect to the normal line of the boundary surface. In this case, when the incident angle of light entering the medium M2 with respect to the normal line is denoted by $\theta_1$, the following relationship is satisfied in accordance with Snell's law:

$$n_1 \cdot \sin\theta_1 = n_2 \cdot \sin\theta_2 \tag{1b}$$

It should be noted that the angle $\theta_3$ of light reflected by the boundary surface with respect to the normal line of the boundary surface is $\theta_3 = -\theta_1$.

Figure 11:
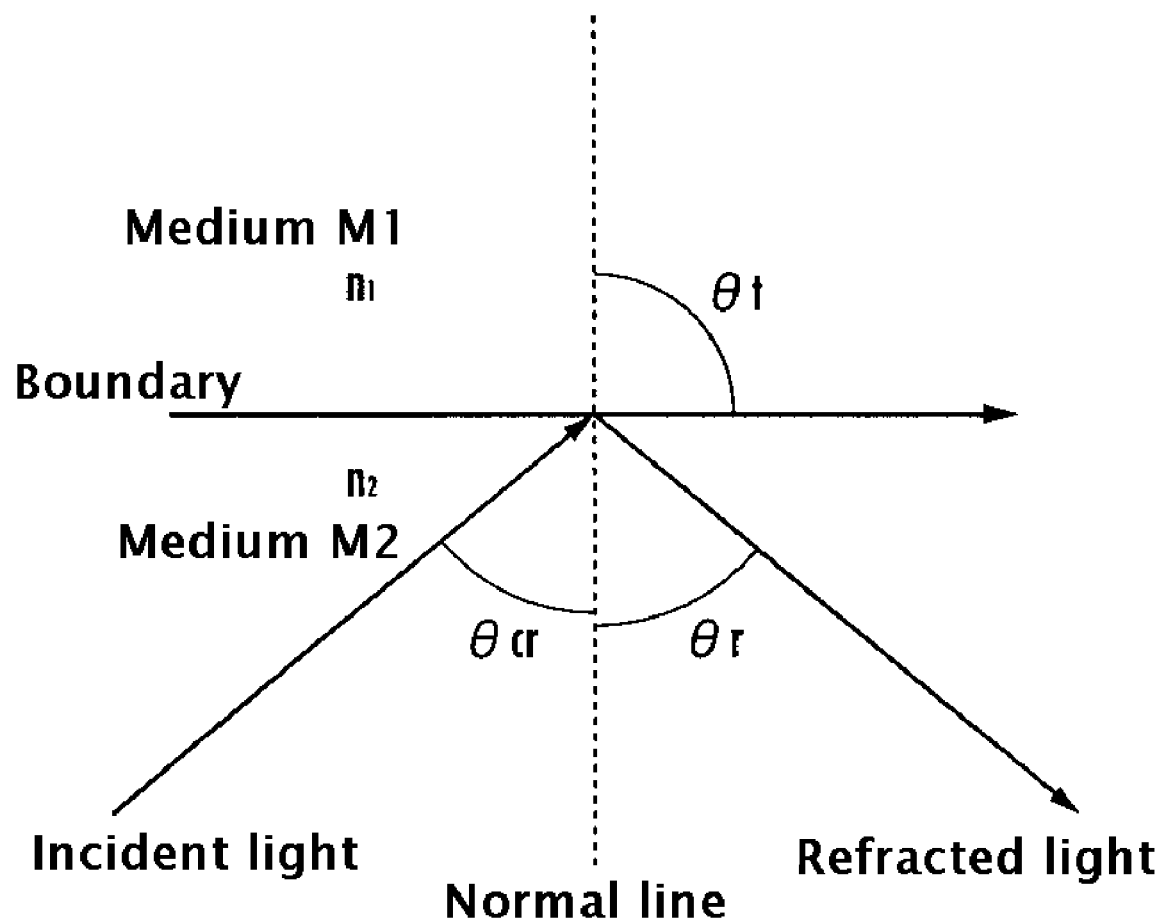
FIG. 11 is a diagram illustrating the operation of the incident light and reflected light and transmitting light in the rotary encoder of FIG. 4.

Furthermore, as shown in FIG. 11, when light from the medium M2 with a higher refractive index of $n_2$ enters the medium M1 with a lower refractive index of $n_1$ ($n_2 > n_1$), if the incident angle exceeds a prescribed incident angle $\theta_{cr}$, the light cannot enter the medium M1 and is totally reflected by the boundary surface. This incident angle $\theta_{cr}$ where total reflection takes place is called as a critical angle, and the relationship between $\theta_{cr}$, $n_1$, and $n_2$ can be represented by:

$$\sin\theta_{cr} = n_1/n_2 \tag{2b}$$

Namely, at the critical angle $\theta_{cr}$, the refractive angle $\theta_r = 90°$ derived from the equation (1b). It should be noted that the angle $\theta_r$ of reflected light is $\theta_r=-\theta_{cr}$. For example, suppose that the medium M1 is air ($n_1=1.0$) and the medium M2 is an acrylic resin ($n_2=1.49$). In this case, the critical angle $\theta_{cr}$ is equal to 42.2°.

Accordingly, it is desirable that the material for forming the rotary light guide disk 5 be a material that has a larger refractive index than that of air and the critical angle $\theta_{cr}$ smaller than the set angle of the first reflecting surface 13 (for example, 45°). An example of such a material includes an acrylic resin. When the rotary light guide disk 5 is formed of such a material, the incident light can be totally reflected by the first reflecting surface 13 to be guided toward the rotary shaft 6.

The second reflecting surface 14 is configured to have a reflecting face for converging the light reflected by the first reflecting surface 13 toward the light receiving device 3. For example, the second reflecting surface 14 can include a parabolic surface having a focus at a position at or in the vicinity of the light receiving device 3. Alternatively, the second reflecting surface 14 can be composed of a composite reflecting surface which includes a plurality of reflecting areas each being inclined with a prescribed angle (not shown).

The outgoing light surface 15 can be formed of a spherical shape with its center being the position of the light receiving unit 3. In this configuration, the light reflected by the second reflecting surface 3 can be incident on the outgoing light surface 15 by the angle of 90°. When the light is incident on the outgoing light surface 15, which is a boundary surface between mediums with different refractive indices, the light incident on the boundary surface at an angle of 90° with respect to the outgoing light surface 15 can go out by an angle of 90° with respect to the outgoing light surface 15 (as derived from the equation (1b)). Accordingly, the light reflected by the second reflecting surface 14 can go out from the outgoing light surface 15 without being affected by any optical effect of the outgoing light surface 15, such as by refraction, reflection, and other optical effects causing optical loss. This can achieve effective convergence of the light to the light receiving device 3.

A description will now be given of the operation of an optical absolute rotary encoder made in accordance with principles of the presently disclosed subject matter. First, the light emitting devices 2a to 2e are driven by driving signals from a driving circuit to output light that is projected onto the respective tracks 4a to 4e of the rotary disk 4. In the meantime, the rotary disk 4 has slits (transmitting areas) and intercepting areas formed in the tracks 4a to 4e. A rotational position of the rotary disk 4 can be determined by the combination of the slits and/or intercepting areas that are arranged in line just above the light emitting devices 2a to 2e. The combination corresponds to a code representing the absolute value of the rotational position. When a slit (being a transmitting area) is formed in one of the tracks 4a to 4e just above the corresponding one of the light emitting devices 2a to 2e, the light emitted from the light emitting device can pass through the rotary disk 4. Conversely, when an intercepting area faces the light emitting device, the light is intercepted, and does not pass through the rotary disk 4.

The light having passed through the slit is incident on the light incident surface 12 of the rotary light guide disk 5. The incident light is totally reflected by the first reflecting surface 13 by an angle, for example, of 90° with respect to the direction of incident light and is guided toward the rotary shaft 6 (the direction perpendicular to the axis of rotation 17). The light reflected by the first reflecting surface 13 is then further reflected by the second reflecting surface 14 so as to converge at the light receiving device 3. Then, the reflected light passes through the outgoing light surface 15 toward the light receiving device 3. In this instance, if the second reflecting surface 14 is configured to have a parabolic surface having its focus at a position at or in the vicinity of (substantially at) the light receiving device 3, the light reflected by the second reflecting surface 14 can be efficiently converged to the light receiving device 3. Furthermore, when the outgoing light surface 15 is configured to have a spherical shape with its center being the position of the light receiving device 3, the light reflected by the second reflecting surface 14 can be incident on the outgoing light surface 15 by the angle of 90°. Accordingly, the light can go out from the outgoing light surface 15 without being affected by any optical effect of the outgoing light surface 15 such as refraction, reflection, and other optical effects. This can achieve effective convergence of the incident light at the light receiving device 3.

Upon receiving the light, the light receiving device 3 can perform photoelectric conversion to output an electrical signal. In this instance, the received light is composed of superposed light beams that have passed through the slits of the respective tracks 4a to 4e. If the respective light emitting devices 2a to 2e are driven with different driving signals, for example, in a time-division manner, the decoder circuit can process the output signal from the light receiving device 3 to determine which of the light beams emitted from the light emitting devices and which have have passed through slits is received. In this manner, the combination of consecutive slits and intercepting areas which form a code can be determined, thereby determining the corresponding absolute value of the rotational position.

In the present exemplary embodiment, the light emitting unit and the light receiving unit can be mounted on the same circuit substrate. Furthermore, the rotary light guide disk formed as a light guide unit can effectively guide light, emitted from the light emitting unit and which has passed through slits of the rotary disk, toward the light receiving unit. This configuration can provide a small and simple-structured optical absolute rotary encoder for accurate determination of the absolute value of a rotational position.

It should be appreciated that in the present exemplary embodiment a collimator lens or other optical parts can be provided which can collimate light emitted from the light emitting devices 2a to 2e to project parallel light on the respective tracks 4a to 4e of the rotary disk 4. Since such optical parts can also be mounted on the circuit substrate 1, the optical absolute rotary encoder can be miniaturized with a simple structure.

In the present exemplary embodiment, the rotary disk can rotate, via the rotary shaft coupled to the rotary light guide disk, with respect to the light emitting devices. However, the present invention is not limited thereto. In another exemplary embodiment, the rotary disk may be fixed and the rotary shaft may be coupled to the circuit substrate so that the light emitting devices mounted on the circuit substrate can rotate relative to the rotary disk. In this instance, since the light emitting devices, the light receiving device, their driving circuits, and other associated parts are mounted on the same single circuit board, the rotation of the circuit board can be easily performed.

In the present exemplary embodiment, the rotary light guide disk and the rotary disk are configured to rotate together. However, the present invention is not limited thereto. In another exemplary embodiment, only the rotary disk may rotate.

Figure 12A:
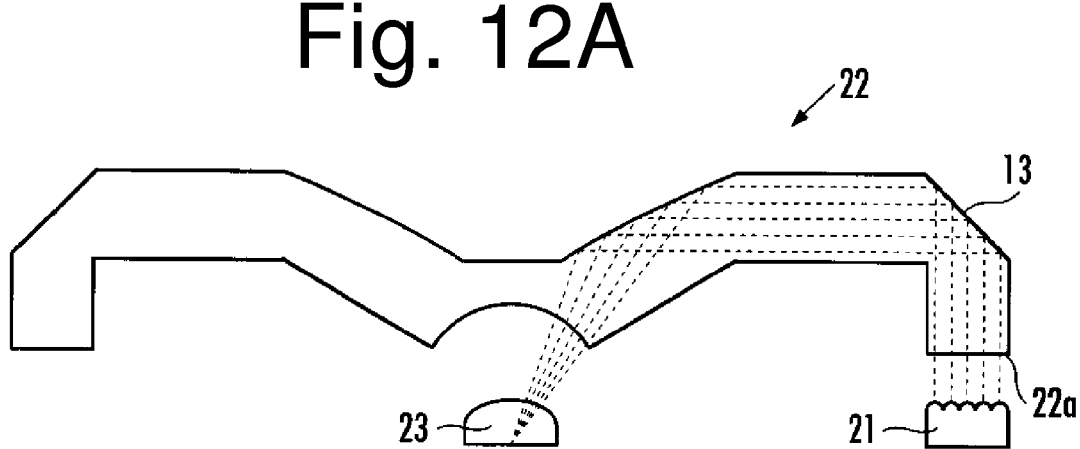
FIGS. 12A and 12B are cross-sectional side views illustrating other embodiments of a light guide unit of an optical absolute rotary encoder made in accordance with principles of the presently disclosed subject matter.

FIG. 12A is a cross sectional view showing an example of an optical absolute rotary encoder made in accordance with a second exemplary embodiment, including a rotary light guide disk 22, a light emitting unit 21, and a light receiving unit 23.

The other components can be configured the same or similar to those of the previous exemplary embodiment, and therefore they are omitted in the drawing. The present exemplary embodiment is different from the previous exemplary embodiment in that the shape of the light incident surface 22a of the rotary light guide disk 22 is different. In the following description, the same or similar components in the previous exemplary embodiment will be denoted by the same reference numerals and a description thereof will be appropriately omitted.

In the optical absolute rotary encoder in this exemplary embodiment, light emitting devices such as laser diodes are used for emitting parallel light as the plurality of light emitting devices constituting the light emitting unit 21. In this instance, the entire light incident surface 22a of the rotary light guide disk 22 can be made flat. Namely, the light incident surface 22a has no groove for guiding light toward the reflecting surface 13 as in the light incident surface 12 of the previous exemplary embodiment (see FIG. 5). The remaining components and construction can be the same or similar to the previous exemplary embodiment.

FIG. 12A shows dotted lines representing respective light paths in the case where the light emitted from the light emitting devices of the light emitting unit 21 are incident on the rotary light guide disk 22 and guided thereby. Parallel light beams from the plurality of light emitting devices of the light emitting unit 21 are projected onto the respective tracks 4a to 4e of the rotary disk 4 (not shown). Then, the light having passed through the slits formed in the tracks 4a to 4e is incident on the rotary light guide disk 22 via the flat light incident surface 22a. In this instance, the incident light beams are parallel light beams with each other. Accordingly, the incident light beams can be guided to the first reflecting surface 13 efficiently even without any grooves 12f to 12i as shown in the previous exemplary embodiment. The remaining operations can be the same or similar to those of the previous exemplary embodiment, and accordingly, a detailed description will be omitted here.

In the present exemplary embodiment, as in the previous exemplary embodiment, the light emitting unit and the light receiving unit can be mounted on the same circuit substrate. Furthermore, the rotary light guide disk can effectively guide light, emitted from the light emitting unit and which has passed through slits of the rotary disk, toward the light receiving unit. This configuration can provide a small and simple-structured optical absolute rotary encoder for accurate determination of the absolute value of a rotational position. Furthermore, the present exemplary embodiment has a flat light incident surface of the rotary light guide disk. Accordingly, when light emitting devices capable of emitting parallel light, such as laser diodes, are used, incident light can be effectively guided to the light receiving unit with a simple structure.

Figure 12B:
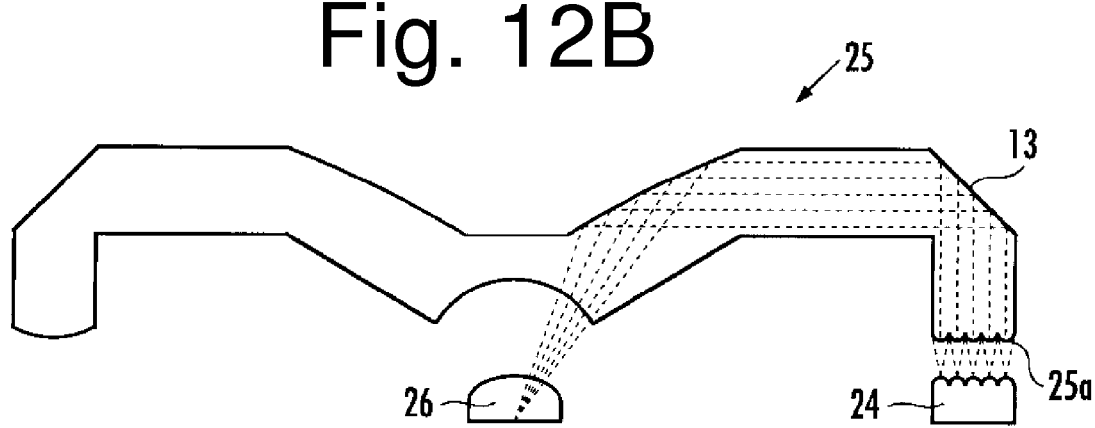

FIG. 12B is a cross sectional view showing an optical absolute rotary encoder in accordance with a third exemplary embodiment, including a rotary light guide disk 25, a light emitting unit 24, and a light receiving unit 26. The other components can be the same or similar to those of the first exemplary embodiment, and therefore they are omitted in the drawing. The present exemplary embodiment is different from the first exemplary embodiment in that the shape of the light incident surface 25a of the rotary light guide disk 25 is different. In the following description, the same or similar components in the previous exemplary embodiment will be denoted by the same reference numerals and a description thereof will be appropriately omitted.

In the optical absolute rotary encoder in this exemplary embodiment, light emitting devices such as LEDs emitting light in a circumferential direction are used as the plurality of light emitting devices constituting the light emitting unit 24. In this instance, the light incident surface 25a of the rotary light guide disk 25 can be configured to have a curved surface (for example, a parabolic lens shape) so that the light emitted from the light emitting unit 24 can be collimated. Namely, the light incident surface 25a has no groove for guiding light toward the reflecting surface 13 as in the light incident surface 12 of the first exemplary embodiment. The remaining components and construction are the same or similar to those of the previous exemplary embodiments.

In FIG. 12B, dotted lines represent respective light paths in the case where the light emitted from the light emitting devices of the light emitting unit 24 are incident on the rotary light guide disk 25 and guided thereby. Light beams emitted from the plurality of light emitting devices of the light emitting unit 24 in the circumferential direction are projected onto the respective tracks 4a to 4e of the rotary disk 4 (not shown). Then, the light that has passed through the slits formed in the tracks 4a to 4e is incident on the rotary light guide disk 25 via the light incident surface 25a. In this instance, the incident light beams become parallel light beams with each other by the curved light incident surface 25a. Accordingly, the incident light beams can be guided to the first reflecting surface 13 efficiently even without any grooves 12f to 12i of the first exemplary embodiment. The remaining operations can be the same or similar to those of the previous exemplary embodiment, and accordingly, a detailed description will be omitted here.

In the present exemplary embodiment, as in the first exemplary embodiment, the light emitting unit and the light receiving unit can be mounted on the same circuit substrate. Furthermore, the rotary light guide disk can effectively guide light, emitted from the light emitting unit and which has passed through slits of the rotary disk, toward the light receiving unit. This configuration can provide a small and simple-structured optical absolute rotary encoder for accurate determination of the absolute value of a rotational position. Furthermore, the present exemplary embodiment has a curved light incident surface on the rotary light guide disk for collimating incident light. Accordingly, when light emitting devices capable of emitting light in a circumferential direction, such as LEDs, are used, incident light can be effectively guided to the light receiving unit with a simple structure and without any additional optical parts such as a collimator lens, or any grooves for effectively guiding incident light to the reflecting surface 13.

Figure 13:
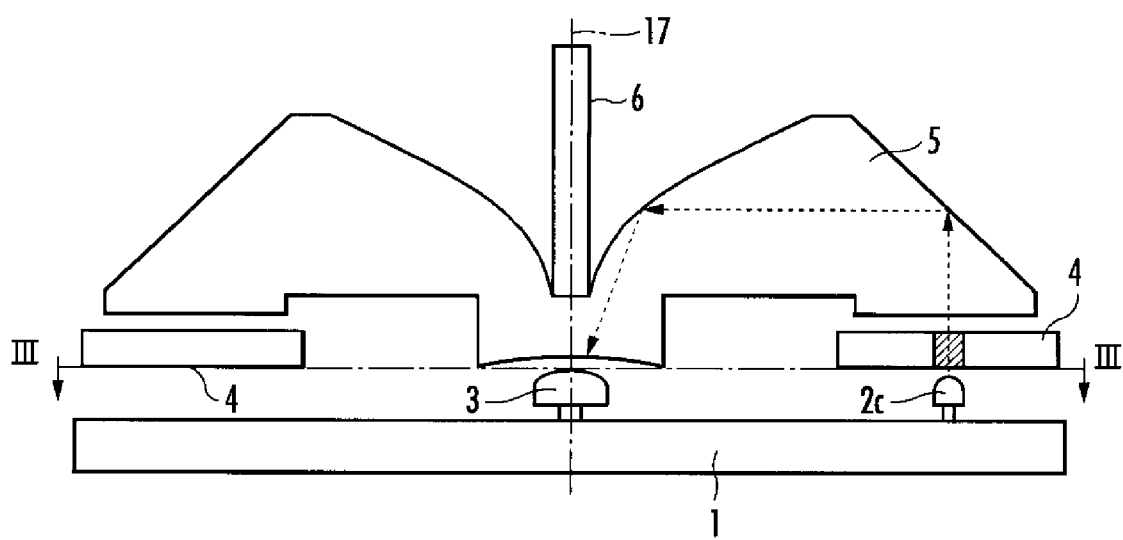
FIG. 13 is a cross-sectional side view illustrating the configuration of another embodiment of an optical absolute rotary encoder made in accordance with principles of the presently disclosed subject matter.

FIG. 13 shows a cross-sectional view of an optical absolute rotary encoder made in accordance with principles of the presently disclosed subject matter. The optical absolute rotary encoder of the present exemplary embodiment can include a plurality of light emitting devices 2a to 2e (five light emitting devices in this exemplary embodiment), a single light receiving device 3, a rotary disk 4, and a rotary light guide disk 5. The plurality of light emitting devices 2a to 2e can project light onto the rotary disk 4. Here, the rotary disk 4 is one example of an optical scale having an absolute pattern. The rotary light guide disk 5 which serves as a light guide unit can guide the light passing through the rotary disk 4 to the light receiving device 3. The light receiving device 3 can receive light that has been emitted from the light emitting devices 2a to 2e, and which has passed through the rotary disk 4, and has been transmitted through the rotary light guide disk 5. Note that the five light emitting devices 2a to 2e and the single light receiving device 3 correspond to the light emitting unit and the light receiving unit in accordance with this embodiment of the presently disclosed subject matter, respectively.

Figure 14:
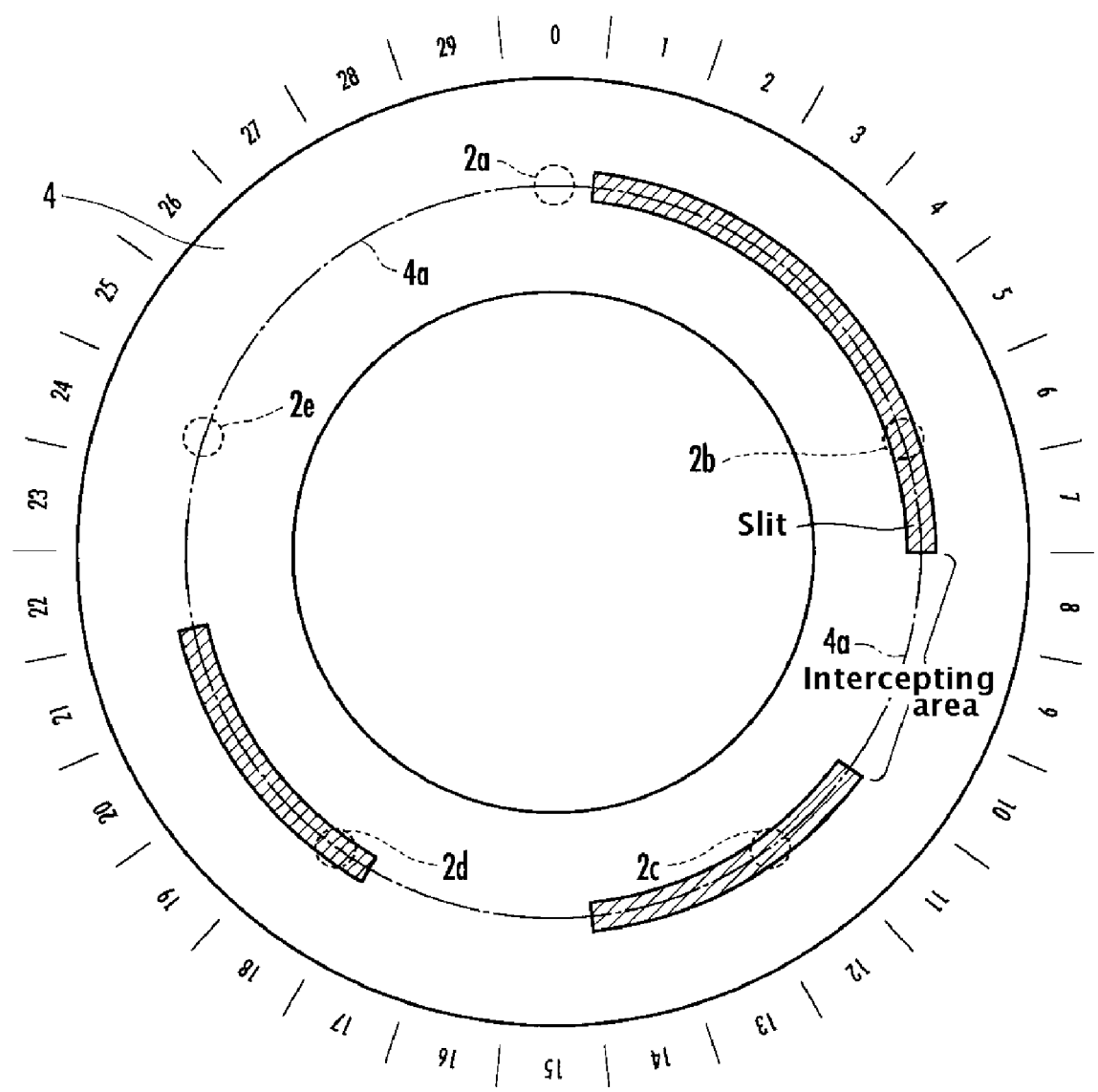
FIG. 14 is a top view showing the face of the optical scale (being a rotary disk) of the optical absolute rotary encoder of FIG. 13, taken along line III-III of FIG. 13.

FIG. 14 is a top view of the rotary disk 4 of FIG. 13, taken along the line III-III of FIG. 13. The rotary disk 4 can take a disk shape having a through hole formed at the center thereof and can have a surface which serves as an optical recording surface. The optical recording surface is composed of a single track 4a which has a circumferential strip part with a predetermined width for signal recording. The track 4a has slits (being transmitting areas) for allowing light to pass therethrough. Areas other than slits are configured to intercept the light (being intercepting areas). In FIGS. 13 and 14, the slits (transmitting areas) are shaded. In this manner, signals can be recorded on the rotary disk 4.

The combinations of slits formed in the single track 4a of the rotary disk 4 can constitute the absolute pattern (being the absolute value code pattern). For example, a slit being a transmitting area shall stand for a value of "1" and an intercepting area shall stand for a value of "0." A combination of slits and/or intercepting areas formed in the single track 4a of the rotary disk 4 at five positions opposed to the light emitting devices 2a to 2e can represent a 5-bit signal which corresponds to a single absolute value of a rotational position.

In the present exemplary embodiment, the five light emitting devices 2a to 2e (for example, five LEDs) and the single light receiving device 3 (for example, a single photodiode) are mounted on the same circuit substrate 1. That circuit substrate 1 is disposed at one side of the rotary disk 4. In this exemplary embodiment, the five light emitting devices 2a to 2e are arranged at equal intervals in a circumferential line in the circumferential direction of the rotary disk 4 while they face the circumferential track 4a. The light receiving device 3 is disposed on the axis of rotation 17 of the rotary disk 4.

It should be noted that this example of the optical absolute rotary encoder made in accordance with the presently disclosed subject matter can include a drive circuit for driving the light emitting devices 2a to 2e, a drive circuit for driving the light receiving device 3, a decoder circuit for determining an absolute value of a rotational position based on the output signal from the light receiving device 3, and other circuits (which are not shown in the drawings). Those electric circuits can also be mounted on the circuit substrate 1.

The structure of the rotary light guide disk 5, the positional relationship between the rotary disk 4 and the rotary light guide disk 5, the rotary structure, and other configurations can be the same as or similar to those of the previous exemplary embodiments, and accordingly, descriptions thereof will be omitted here. Accordingly, the rotary disk 4 and the light emitting devices 2a to 2e are disposed so that they rotate relative to each other. When the rotary disk 4 rotates, a code corresponding to the absolute value of the rotational position of the rotary disk 4 can be represented by a combination of slits and/or intercepting areas formed in the track 4a in the circumferential direction of the rotary disk 4 just above the light emitting devices 2a to 2e. The rotary disk 4 of FIG. 14 can provide signals representing the absolute values of rotational positions using the five light emitting devices 2a to 2e. The 5-bit signals or code patterns and the corresponding positions are shown in the table of FIG. 15 where the slit being a transmitting area shall stand for a value of "1" and the intercepting area shall stand for a value of "0." Using these 5-bit signals, absolute values of rotational positions which are given by dividing the overall scale by 30 can be determined.

Figures 15, 16:
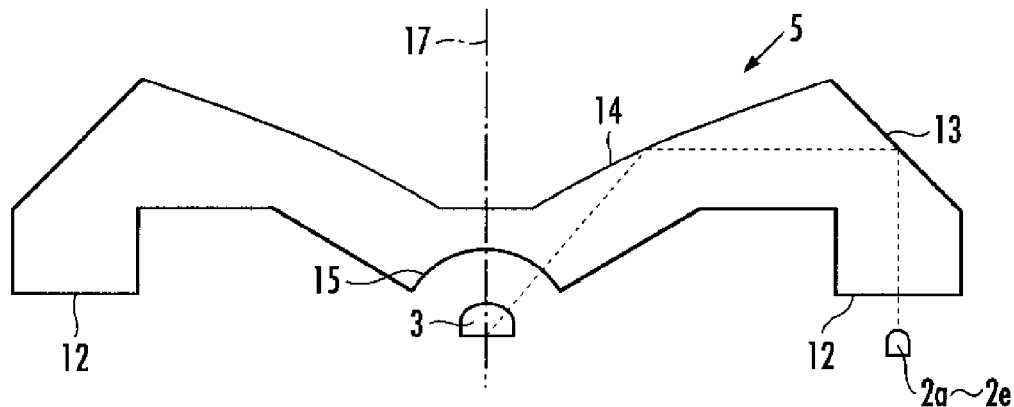
FIG. 15 is a table showing the absolute pattern codes of the optical scale of FIG. 14.
FIG. 16 is a cross-sectional detailed side view illustrating the light guide unit (being a rotary light guide disk) of the optical absolute rotary encoder of FIG. 13.

As shown in the table of FIG. 15, the difference between the codes representing the adjacent rotational positions is 1 bit. For example, the code pattern is "01110" when the rotational position is "0." The code pattern is "01100" when the rotational position is "1." When the rotary disk 4 rotates by one step and therefore the rotational position information is changed, the code pattern corresponding thereto is changed only by 1 bit. For example, when the rotary disk 4 rotates by one step to shift from the rotational position of "0" to "1," the code pattern is changed from "01110" to "01100." Namely, only one bit corresponding to the light emitting device 2d changes. Accordingly, any readout error should occur at intermediate rotational positions.

The rotary light guide disk 5 has an optical path for guiding incident light, which has passed through the slits formed in the track 4a of the rotary disk 4, to the light receiving device 3. In the example shown in FIG. 13, a slit is formed in the track 4a just above the light emitting device 2c. As shown by the dotted arrows, the light that passes through the slit is incident on the rotary light guide disk 5 to be guided toward the light receiving device 3.

Figure 17A:
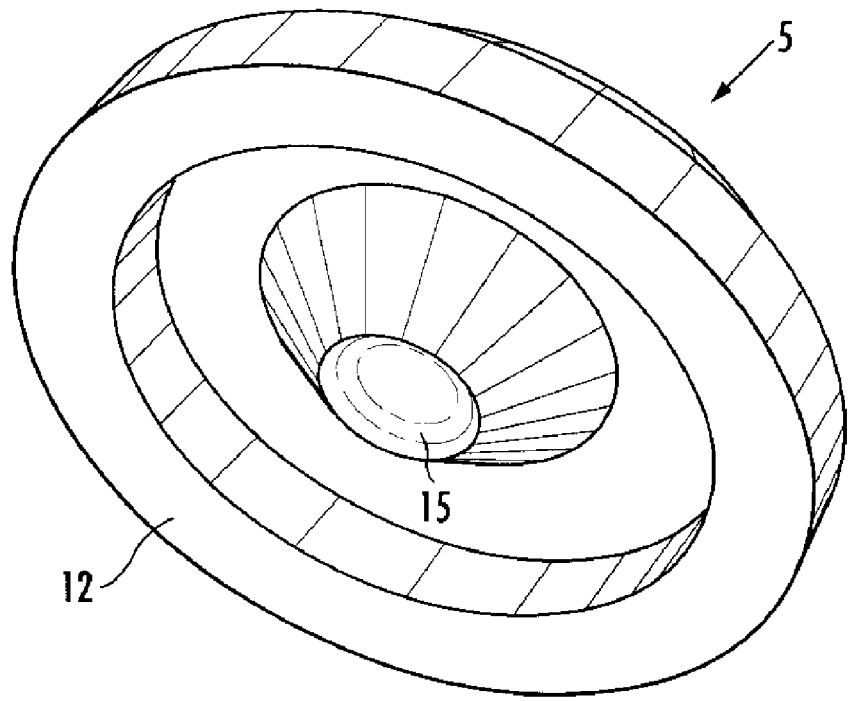
FIGS. 17A and 17B are perspective views showing the rotary light guide disk of the optical absolute rotary encoder of FIG. 13 from below and above, respectively.
Figure 17B:
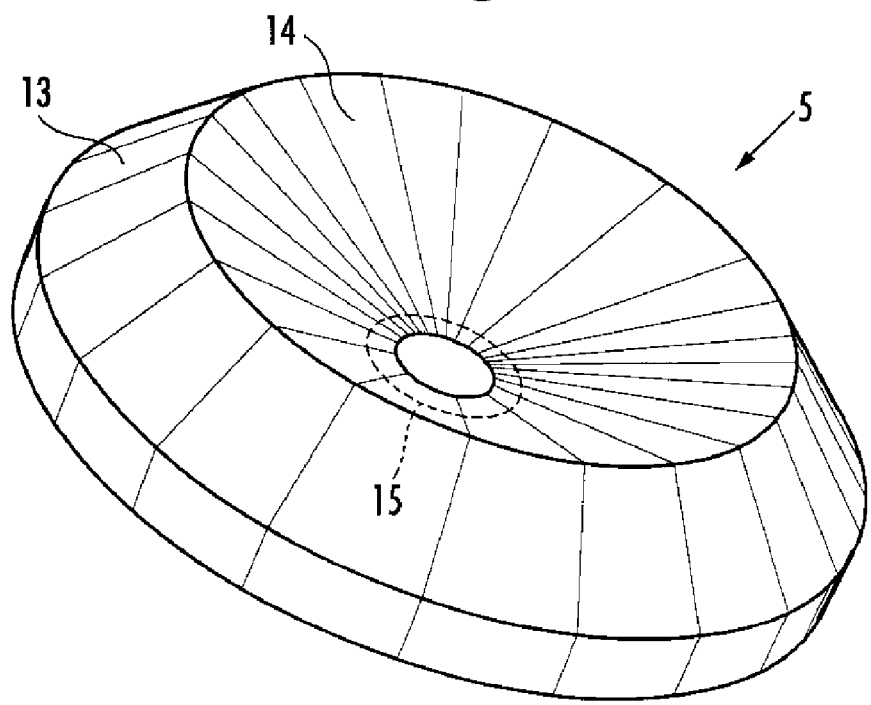

FIG. 16 is a side cross-sectional view, showing details of the light guide structure of the rotary light guide disk 5. FIG. 16 shows dotted lines representing respective light paths in the case where the light emitted from the light emitting device 2c is incident on the rotary light guide disk 5 to be guided to the light receiving device 3. The remaining light emitting devices 2a, 2b, 2d, and 2e can produce light paths that are the same or similar to the light path produced by the light emitting device 2c within the rotary light guide disk 5. The rotary light guide disk 5 has the same basic structure as in the previous exemplary embodiments, and detailed descriptions for the light incident surface 12, the first reflecting surface 13, the second reflecting surface 14 and the outgoing light surface 15 will be omitted here. FIG. 17A is a perspective view of the rotary light guide disk 5 when seen from below, and FIG. 17B is a perspective view thereof when seen from above.

A description will now be given of the operation of the optical absolute rotary encoder of the present exemplary embodiment. First, the light emitting devices 2a to 2e are driven by the driving signals from the driving circuit to output light that is projected onto the track 4a of the rotary disk 4. In the meantime, the rotary disk 4 has slits (transmitting areas) and intercepting areas formed in the track 4a. A rotational position of the rotary disk 4 can be determined by the combination of the slits and/or intercepting areas arranged in the circumferential track 4a just above the light emitting devices 2a to 2e. The combination corresponds to a code representing the absolute value of the rotational position. When a slit (being a transmitting area) is formed in the track 4a just above the light emitting devices 2a to 2e, the light emitted from the light emitting device can pass through the rotary disk 4. Conversely, when an intercepting area faces the light emitting device, the light is intercepted.

The light that has passed through the slit is incident on the light incident surface 12 of the rotary light guide disk 5. The incident light can be totally reflected by the first reflecting surface 13 by an angle of 90° with respect to the direction of the incident light to be guided toward the rotary shaft 6 (the direction perpendicular to the axis of rotation 17). The light reflected by the first reflecting surface 13 is further reflected by the second reflecting surface 14 so as to converge to the light receiving device 3. Then, the reflected light passes through the outgoing light surface 15 toward the light receiving device 3. In this instance, if the second reflecting surface 14 is configured to have a parabolic surface having its focus at a position at or in the vicinity of the light receiving device 3, the light reflected by the second reflecting surface 14 can be efficiently converged to the light receiving device 3. Furthermore, when the outgoing light surface 15 is configured to have a spherical shape with its center at the position of the light receiving device 3, the light reflected by the second reflecting surface 14 can be incident on the outgoing light surface 15 by the angle of 90°. Accordingly, the light can go out from the outgoing light surface 15 without being affected by any optical effect of the outgoing light surface 15 such as refraction, reflection, and other optical effects. This can achieve effective convergence of the incident light to the light receiving device 3.

Upon receiving the light, the light receiving device 3 can perform photoelectric conversion to output an electrical signal. In this instance, the received light is composed of superposed light beams which have passed through the slits of the track 4a. If the respective light emitting devices 2a to 2e are driven with different driving signals, for example, in a time-division manner, the decoder circuit can process the output signal from the light receiving device 3 to determine which of the light beams emitted from the light emitting devices and which have passed through slits is received. In this manner, the combination of slits and intercepting areas which form a code can be determined, thereby determining the corresponding absolute value of the rotational position.

In the present exemplary embodiment, since the difference between the codes corresponding to adjacent rotational positions is one bit, it is not necessary to provide a mechanism for preventing readout error at intermediate rotational positions. It is possible to determine an absolute value of a rotational position with high accuracy using only a single track. In the present exemplary embodiment, the light emitting unit and the light receiving unit can be mounted on the same circuit substrate. Furthermore, the rotary light guide disk formed as a light guide unit can effectively guide light, emitted from the light emitting unit and passing through slits of the rotary disk, toward the light receiving unit. This configuration can provide a small and simple-structured optical absolute rotary encoder for accurate determination of the absolute value of a rotational position.

It should be appreciated that in the present exemplary embodiment a collimator lens or other optical parts can be provided which can collimate light emitted from the light emitting devices 2a to 2e to project parallel light on the track 4a of the rotary disk 4. Since such optical parts can also be mounted on the circuit substrate 1, the optical absolute rotary encoder can be miniaturized with a simple structure.

In the present exemplary embodiment, the rotary disk can rotate, via the rotary shaft coupled to the rotary light guide disk, with respect to the light emitting devices. However, the present invention is not limited thereto. In another exemplary embodiment, the rotary disk may be fixed and the rotary shaft may be coupled to the circuit substrate so that the light emitting devices mounted on the circuit substrate can rotate relative to the rotary disk. In this instance, since the light emitting devices, the light receiving device, their driving circuits, and other associated parts can be mounted on the same single circuit board, the rotation of the circuit board can be easily performed.

In the present exemplary embodiment, the rotary light guide disk and the rotary disk are configured to rotate together. However, the present invention is not limited thereto. In another exemplary embodiment, only the rotary disk may rotate.

In the present exemplary embodiment, the five light emitting devices 2a to 2e are arranged at equal intervals. As an alternative exemplary embodiment, five light emitting devices 2a to 2e can be arranged at predetermined distances that are not equal intervals.

Figure 18:
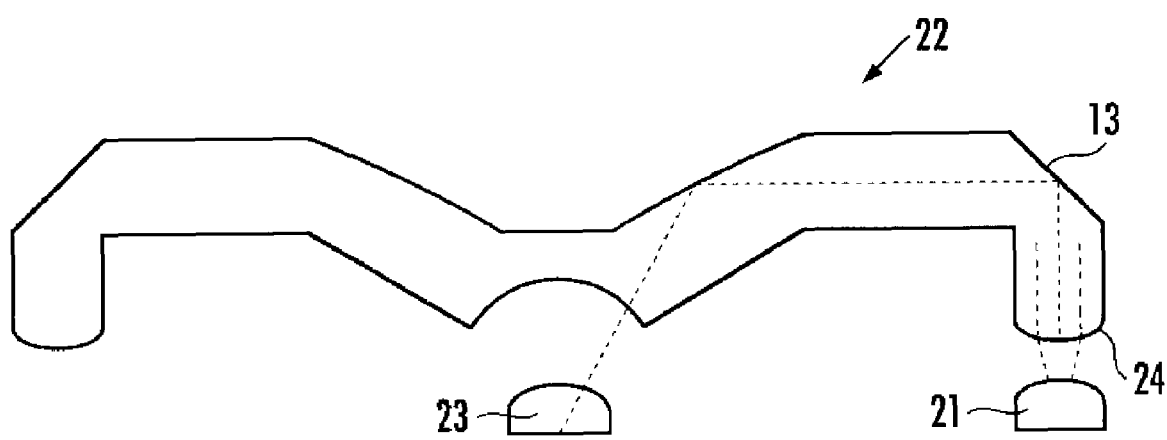
FIG. 18 is a cross-sectional side view illustrating another embodiment of a light guide unit of an optical absolute rotary encoder made in accordance with principles of the presently disclosed subject matter.

FIG. 18 is a cross sectional view showing an optical absolute rotary encoder in accordance with a fifth exemplary embodiment, including a rotary light guide disk 22, a light emitting unit 21, and a light receiving unit 23. The other components can be the same as those of the previous exemplary embodiments, and therefore they are omitted in the drawing. The present exemplary embodiment is different from the previous exemplary embodiments in that the shape of the light incident surface 24 of the rotary light guide disk 22 is different. In the following description, the same or similar components in the previous exemplary embodiment will be denoted by the same reference numerals and a description thereof will be appropriately omitted.

In the optical absolute rotary encoder in this exemplary embodiment, light emitting devices such as LEDs emitting light in the circumferential direction are used as the plurality of light emitting devices constituting the light emitting unit 21. In this instance, the light incident surface 24 of the rotary light guide disk 22 is configured to have a curved surface (for example, a parabolic lens shape) so that the light emitted from the light emitting unit 21 can be collimated. The remaining components and construction can be the same as or similar to the previous exemplary embodiments.

In FIG. 18, dotted lines represent respective light paths in the case where the light emitted from the light emitting devices of the light emitting unit 21 are incident on and guided by the rotary light guide disk 22. Light beams emitted from the light emitting unit 21 in the circumferential direction are projected onto the single track 4a of the rotary disk 4 (not shown). Then, the light that passes through the slits formed in the track 4a are incident on the rotary light guide disk 22 via the light incident surface 24. In this instance, the incident light beams are caused to be parallel light beams, when compared with each other, by the curved light incident surface 24. Accordingly, the incident light beams can be guided to the first reflecting surface 13 efficiently. The remaining operations can be the same or similar to the previous exemplary embodiments, and accordingly, a detailed description will be omitted here.

In the present exemplary embodiment, as in the previous exemplary embodiments, since the difference between the codes corresponding to adjacent rotational positions is one bit, it is possible to determine an absolute value of a rotational position with high accuracy only using a single track. In the present exemplary embodiment, the light emitting unit and the light receiving unit can be mounted on the same circuit substrate. Furthermore, the rotary light guide disk can effectively guide light which was emitted from the light emitting unit and which has passed through slits of the rotary disk, toward the light receiving unit. This configuration can provide a small and simple-structured optical absolute rotary encoder for accurate determination of the absolute value of a rotational position.

Furthermore, the present exemplary embodiment has a curved light incident surface of the rotary light guide disk for collimating incident light. Accordingly, when light emitting devices capable of emitting light in a circumferential direction, such as LEDs, are used, incident light can be effectively guided to the light receiving unit with a simple structure without any additional optical parts such as a collimator lens, or any grooves for guiding incident light to the reflecting surface 13.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. All conventional art references described above are hereby incorporated in their entirety by reference.

What is claimed is:

1. An optical absolute rotary encoder, comprising:
an optical scale having an absolute pattern representing a code corresponding to a single absolute value including a combination of a transmitting area and an intercepting area, the optical scale having a first side and an opposing second side;
a light emitting unit located adjacent the first side of the optical scale and configured to project light on the optical scale;
a light receiving unit located at the same first side as the light emitting unit with respect to the optical scale, and configured to receive light passing through the transmitting area of the optical scale, wherein the light projected from the light emitting unit passes through the optical scale only once per emission; and
a light guide unit configured to guide the light projected from the light emitting unit and passing through the transmitting area to the light receiving unit, wherein
the optical scale and the light emitting unit are configured to rotate relative to each other about an axis of rotation, and the light receiving unit is disposed on the axis of rotation, wherein
the light guide unit has a first reflecting surface configured to totally reflect incident light and a second reflecting surface configured to reflect light reflected by the first reflecting surface so as to converge light to the light receiving unit.

2. The optical absolute rotary encoder according to claim 1, wherein
the first reflecting surface is configured to form an angle of 45° with respect to a direction of the incident light.

3. The optical absolute rotary encoder according to claim 1, wherein
the second reflecting surface is configured to have a parabolic shape with a focus at a position substantially at the light receiving unit.

4. The optical absolute rotary encoder according to claim 1, wherein
the light guide unit has an outgoing light surface configured to allow light reflected by the second reflecting surface to go out toward the light receiving unit, the outgoing light surface being spherically shaped, and the light receiving unit located at a center of the spherical shape of the outgoing light surface.

5. The optical absolute rotary encoder according to claim 1, wherein
the light guide unit has a parabolic incident surface configured to collimate the incident light emitted from the light emitting unit.

6. The optical absolute rotary encoder according to claim 2, wherein
the second reflecting surface is configured to have a parabolic shape with a focus at a position substantially at the light receiving unit.

7. The optical absolute rotary encoder according to claim 2, wherein
the light guide unit has an outgoing light surface configured to allow light reflected by the second reflecting surface to go out toward the light receiving unit, the outgoing light surface being spherically shaped, and the light receiving unit located at a center of the spherical shape of the outgoing light surface.

8. The optical absolute rotary encoder according to claim 3, wherein
the light guide unit has an outgoing light surface configured to allow light reflected by the second reflecting surface to go out toward the light receiving unit, the outgoing light surface being spherically shaped, and the light receiving unit located at a center of the spherical shape of the outgoing light surface.

9. An optical absolute rotary encoder, comprising:
an optical scale having an absolute pattern representing a code corresponding to a single absolute value including a combination of a transmitting area and an intercepting area formed on a single track extending along a circumference of rotation;
a light emitting unit configured to project light on the optical scale; and
a light receiving unit configured to receive light projected from the light emitting unit and passing through the transmitting area of the optical scale, wherein
the light projected from the light emitting unit passes through the optical scale only once per emission, wherein
the optical scale and the light emitting unit are configured so that they rotate relative to each other about an axis of rotation, and the light emitting unit is located at a first side with respect to the optical scale and includes a plurality of light emitting devices located at predetermined intervals along the circumference of rotation; wherein
the light receiving unit is located at the same first side as the light emitting unit with respect to the optical scale, and is disposed on the axis of rotation; and wherein
the optical absolute rotary encoder further comprises a light guide unit configured to guide light that is projected from the light emitting unit, and which passes through the transmitting area, to the light receiving unit.

10. The optical absolute rotary encoder according to claim 9, wherein
the absolute pattern of the optical scale is configured such that the difference between codes corresponding to adjacent absolute values is one bit.

11. The optical absolute rotary encoder according to claim 9, wherein
the absolute pattern of the optical scale is configured such that the difference between codes corresponding to adjacent absolute values is one bit.

12. The optical absolute rotary encoder according to claim 9, wherein
the light guide unit has a first reflecting surface configured to totally reflect incident light and a second reflecting surface configured to reflect light reflected by the first reflecting surface so as to converge light to the light receiving unit.

13. The optical absolute rotary encoder according to claim 9, wherein
the light guide unit has a parabolic incident surface configured to collimate the incident light emitted from the light emitting unit.

14. The optical absolute rotary encoder according to claim 10, wherein
the light guide unit has a first reflecting surface configured to totally reflect incident light and a second reflecting surface configured to reflect light reflected by the first reflecting surface so as to converge light to the light receiving unit.

15. The optical absolute rotary encoder according to claim 12, wherein
the first reflecting surface is configured to form an angle of 45° with respect to a direction of the incident light.

16. The optical absolute rotary encoder according to claim 14, wherein
the first reflecting surface is configured to form an angle of 45° with respect to a direction of the incident light.

17. An optical absolute rotary encoder, comprising:

an optical scale having an absolute pattern representing a code corresponding to a single absolute value including a combination of a transmitting area and an intercepting area formed on a single track extending along a circumference of rotation, and the optical scale having a first side and an opposing second side;

a light emitting unit located adjacent the first side of the optical scale, the light emitting unit configured to project light on the optical scale;

a light receiving unit located adjacent the same first side as the light emitting unit with respect to the optical scale, and the light receiving unit configured to receive light passing through the transmitting area of the optical scale, wherein the light projected from the light emitting unit passes through the optical scale only once per emission; and a light guide unit configured to guide light that is projected from the light emitting unit and passing through the transmitting area to the light receiving unit, wherein the light guide unit has a first reflecting surface configured to totally reflect incident light and a second reflecting surface configured to reflect light reflected by the first reflecting surface so as to converge light to the light receiving unit, and wherein the optical scale and the light emitting unit are configured to rotate relative to each other about an axis of rotation, the light emitting unit is disposed at a circumference of rotation, and the light receiving unit is disposed on the axis of rotation.

18. The optical absolute rotary encoder according to claim 17, wherein
the absolute pattern of the optical scale is configured such that the difference between codes corresponding to adjacent absolute values is one bit.

19. The optical absolute rotary encoder according to claim 17, wherein
the first reflecting surface is configured to form an angle of 45° with respect to a direction of the incident light.

20. The optical absolute rotary encoder according to claim 17, wherein
the light guide unit has a parabolic incident surface configured to collimate the incident light emitted from the light emitting unit.

* * * * *